(12) United States Patent
Swift

(10) Patent No.: US 11,781,520 B2
(45) Date of Patent: Oct. 10, 2023

(54) METHOD TO LIFT WATER AND GENERATE ELECTRICAL POWER

(71) Applicant: Daniel Pritchard Swift, Laramie, WY (US)

(72) Inventor: Daniel Pritchard Swift, Laramie, WY (US)

(*) Notice: Subject to any disclaimer, the term of this patent is extended or adjusted under 35 U.S.C. 154(b) by 405 days.

(21) Appl. No.: 16/856,195

(22) Filed: Apr. 23, 2020

(65) Prior Publication Data

US 2021/0332786 A1 Oct. 28, 2021

(51) Int. Cl.
    *F03B 13/06* (2006.01)
    *F03B 3/00* (2006.01)
    *H02K 7/18* (2006.01)
    *F03B 13/08* (2006.01)
    *F03B 17/00* (2006.01)

(52) U.S. Cl.
    CPC ............... *F03B 13/06* (2013.01); *F03B 3/00* (2013.01); *H02K 7/1823* (2013.01); *F03B 13/086* (2013.01); *F03B 17/005* (2013.01)

(58) Field of Classification Search
    CPC .......... F03B 13/06; F03B 3/00; F03B 13/086; F03B 17/005; H02K 7/1823
    See application file for complete search history.

(56) References Cited

U.S. PATENT DOCUMENTS

2018/0149131 A1* 5/2018 Alkhars ................. F03B 15/16

* cited by examiner

*Primary Examiner* — Viet P Nguyen

(57) ABSTRACT

An improved method of lifting fluid using the difference between atmospheric or higher boosted pressure and fluid vapor or vacuum pressure applied to a series of chambers with a movable plate that divides each into variable volumes, and comprises one stage of the system. Combinations of pressures in the chambers between the movable plates lift the fluid to a height where the fluid column base pressure equals atmospheric or boosted pressure less friction and mass losses. A vertical array of stages, each lifting fluid from the stage below it, allows fluid to be lifted to any height, limited only by structure or geographic elevation. Further; operating pressures are tapped from the top and bottom of a standpipe filled with static fluid, pressure changes are made when the volumes are zero, and the sum of the volume receiving fluid and volume delivering the fluid are constant, making the system closed. Once raised, the fluid may be released for it's end use and more particularly; through a power generator. Where the fluid is water in an open environment and fed through a turbine, the water may be returned to the system reservoir to be reused in the cycle or if in a closed system the fluid may be returned to a chamber under pressure for reuse.

19 Claims, 28 Drawing Sheets

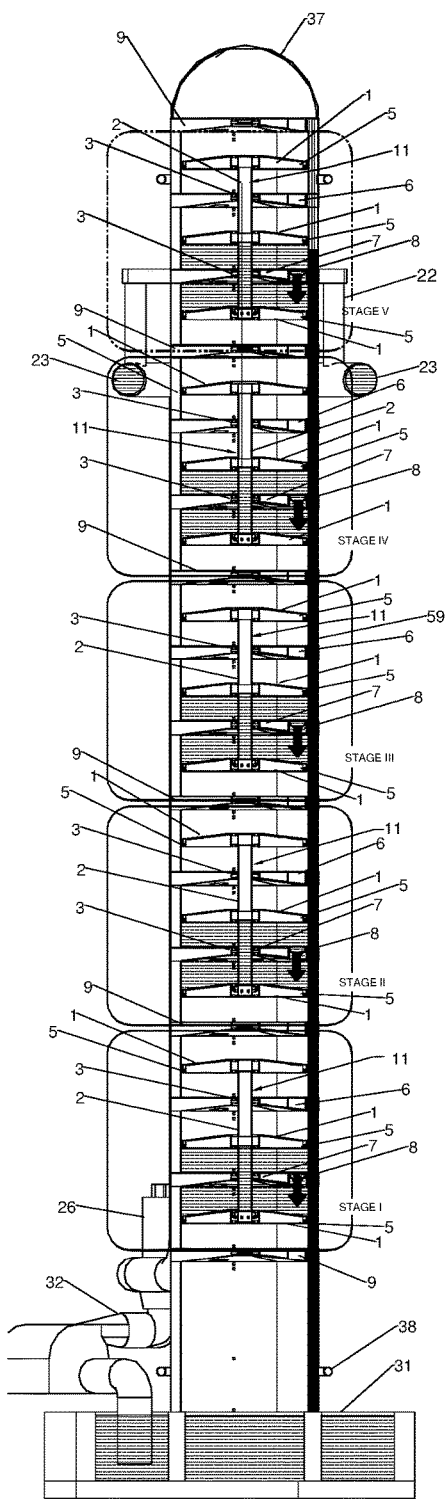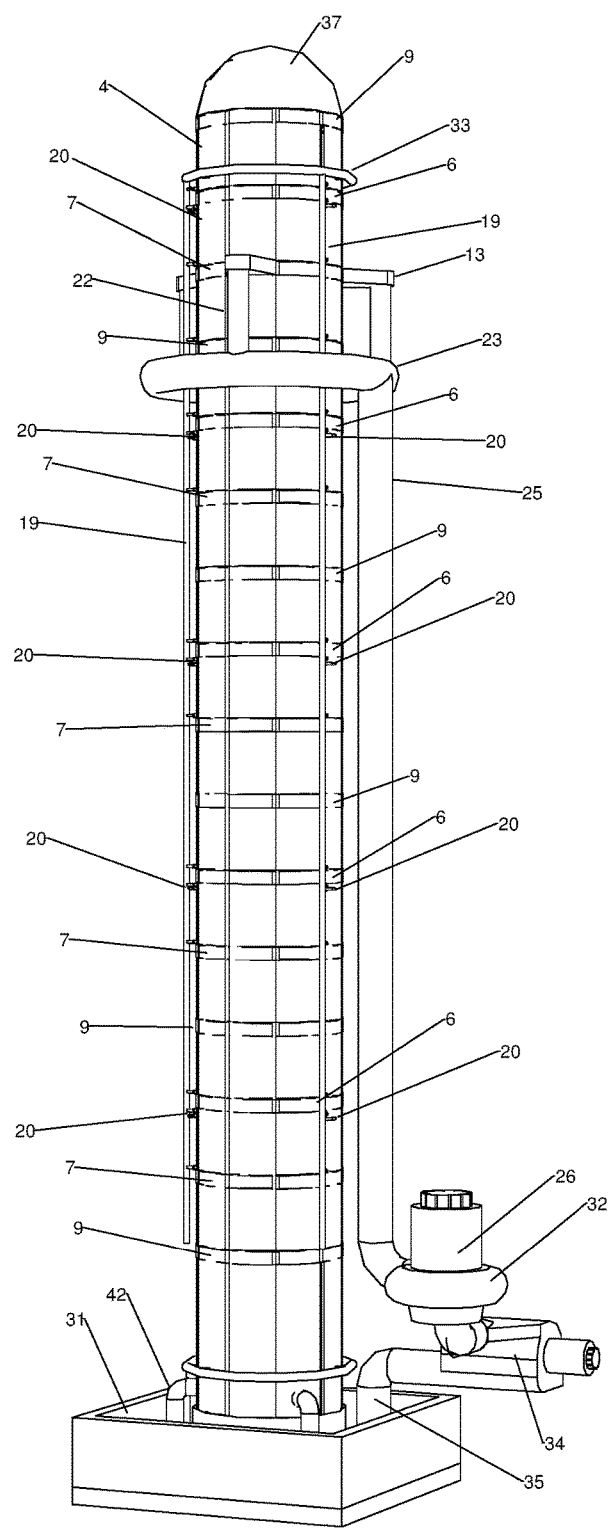
FIG 21                                   FIG 20

METHOD TO LIFT WATER AND GENERATE ELECTRICAL POWER

BACKGROUND OF THE INVENTION

(a) Field of the Invention

This invention relates to power generation, specifically to a method of lifting water from a reservoir, using differences in static pressure, to an elevation then passing the (water) fluid through a turbine driving a generator and back to said reservoir.

(b) Description of the Prior Art

Electrical power is created by various means, most commonly by generators with attached turbines that are driven by flowing water or steam and more recently by generators turned directly by wind or wave action. Alternate methods of generating power without generators such as sunlight conversion through photo voltaic panels have been tried with limited success.

1. The amount of power generated by conventional water turbines is dependent on the mass and velocity of the water that passes through the turbines. The mass is directly related to the quantity of water available and the velocity is related to the height or head of the water above the turbine elevation. Therefore, traditional hydroelectric generators must be located on water courses and have inherent problems;
   (a) More often than not, the water drainage itself must be altered with dams or collection points to develop the required volume and velocity to drive the turbines. This requires enormous expense to build the dams and necessarily eliminates hundreds of miles of natural river courses with man-made lakes and reservoirs.
   (b) Further, because the hydroelectric generators are restricted to a few locations, large transmission lines must be routed to population centers. This requires additional large expenses and results in heavy transmission losses. The transmission lines require transformer stations along its length adding more expense to the electrical system.
   (c) Because hydroelectric power stations must be located along watercourses, there is a practical limit to how much power they can provide.
   (d) Dams and man-made lakes have a useful life span since they fill with sediment, so hydroelectric power on natural waterways could be considered to be a diminishing quantity. Adding to this is the hostility of a segment of the population to construction of any new dams.

Attempts are continuously made to improve hydroelectric power. A method of raising water for power generation is described by U.S. Pat. No. 3,829,246 by Hancock where the water ram effect is replaced by the trompe effect to force water upward into reservoirs in stages, increasing the potential energy of the water to drive a turbine. The disadvantages are clearly that the system must be located at a continuous supply of moving water which limits the power potential and begs the question; why not just run a turbine in the stream rather than wasting energy to lift the water before passing it through a turbine? The use of water or other incompressible fluid in a closed system to generate electricity is attempted in U.S. Pat. No. 8,661,807 by Shyu by using a weight activated by a balance beam tipping onto one of two collapsible volumes to force water to a height through a generator and back to the second volume, tipping the balance beam in the other direction activating the second weight. The mass and mechanics makes this apparatus unsuitable for large scale use.

2. Some of the limitations of hydroelectric power are overcome by turning turbines with steam. Heating water with any number of fuels, reactions, or focusing solar energy creates steam but each method has common and unique disadvantages. The fossil fuels; coal, oil, and gas have the shared disadvantages of:
   (a) They require ecological disruption to extract the fuel. Coal is removed by dangerous deep shaft mining or alternately; strip mining. Lives are occasionally lost in deep shaft mining and after the coal is extracted, mines are abandoned, leaving the shafts to collapse often endangering local inhabitants. A few mines have even been abandoned due to fires that have burned uncontrollably for decades. Miners have always experienced long-term health effects from coal dust and other complications. Strip mining is far safer but disrupts large areas that displaces wildlife, destroys topsoil, and must be reclaimed after extracting the coal. Oil requires constant exploration, drilling of exploratory wells, and ultimately, use of complex expensive equipment to extract the oil. Often oil is found in pristine areas that require construction of roads and pad areas that take decades to recover. Equipment failure can lead to massive ecological damage that takes years to reverse. Natural gas is by far the least destructive and cleanest fossil fuel resource but still requires the exploration and expensive heavy equipment to recover the gas. Also, while the method of fracking expands production there is some controversy about the effects on the environment and there is some limited resistance to its use by the public. All these resources require construction of access and site preparation that affects millions of acres that otherwise would be undisturbed.
   (b) There is a finite supply of gas, oil, or coal that have come to be known as fossil fuels. Once gas, coal, or oil is burned it is destroyed forever. They would be better used in production of chemicals, pesticides, fertilizer, or plastics that are essential to modern life and could be recycled.
   (c) Coal, oil, and gas require expensive transportation systems to get the fuel to the power plant. Fuels move by rail, truck, ship, and pipeline. Each method requires an enormous investment to construct and operate. Each mode is susceptible to failure and when they do fail it can cost lives and cause massive property or environmental damage.
   (d) Because fossil fuel power plants require large amounts of fuel, must accommodate boilers, turbines, scrubber equipment, and cooling towers, they must be strategically located near sources of fuel, large water supplies, transportation hubs, and large open areas. They are huge investments that require constant maintenance and must have the longevity to recover that investment in elevated power costs.
   (e) Fossil fuel power plants are generally located away from population centers so complex transmission grids are required to distribute the power. This is an additional expense and results in high power loss. Transformer stations are required at short intervals to keep power moving. In addition to the expense, the right-of-ways consume large areas and could be better used for housing, agriculture, timber production, or recreation.

(f) Ownership of power plants is necessarily limited to a few powerful companies that have the resources to build the infrastructure and acquire the fuel, often internationally. This can lead to price fixing or tampering and manipulation by central governments.

(g) Concentration of power generation into small numbers of plants and transmission through complex grids makes the system vulnerable to failure and attack.

(h) Fossil fuel power plants are heavily regulated making it extremely difficult to build new plants and respond to power demand. They require long construction and engineering time and because of their complexity, life spans, and technology changes there is limited opportunity for standardization and duplication.

(i) Fossil fuel plant combustion emissions require scrubbing but still emit some pollution.

(j) Energy must be consumed to produce electricity, making it more expensive and noncompetitive for general heating, cooling, and as a general alternative to power vehicles.

3. An obvious alternative to fossil fuels to generate steam is heating water with nuclear fusion or fission but in addition to many of the above-mentioned disadvantages these methods have their own shared problems:

(a) The fuel is difficult to find and refine, requiring expensive specialized equipment and highly trained personnel to process.

(b) The power plants require highly trained staff to operate and maintain.

(c) In instances of plant failure or natural disasters the plants have left widespread radioactive contamination that can last decades. The radioactivity causes metal fatigue and cooling failures that can lead to reactor scrams or shutdowns. In Chernobyl the core reached meltdown, killing scores of people and forcing abandonment of the city. The core is still unapproachable. In the case of Fukushima a natural disaster flooded the reactors, cooling pumps, and controls forcing the evacuation of 150,000 people and spreading measurable radiation across the Pacific Ocean. The economic cost cannot be estimated.

(d) The spent fuel retains its radioactivity with half-lives of tens of thousands of years. The fuel must be packaged in damage proof containers and stored in subterranean isolation until the fuel becomes inert.

(e) If a terrorist attack were successful against a nuclear power plant, the damage and fatalities could be catastrophic.

(f) Fission has yet to be successfully developed as a viable method to generate power.

U.S. Pat. No. 8,839,621 by Ferguson et al is an effort to improve both fossil fuel and nuclear power plants by first heating water with fossil and biomass fuels, then using nuclear power to super heat the steam, thus increasing the efficiency of the plant. This is important, but does not eliminate the inherent disadvantages of both methods of generating power. Another method of increasing efficiency by combining fossil and nuclear fuel is proposed in U.S. Pat. No. 4,021,299 by Rigollot, but the disadvantages remain.

4. Another method of heating water or other elements is by focused solar energy. A limited and largely experimental method of producing power by focused solar energy on a vessel with mirrored arrays is detailed in U.S. Pat. No. 4,026,112 by Scragg et al. Alternately, U.S. Pat. No. 4,311,011 by Lewis delineates a combined solar-wind method of producing steam to lift water that in turn drives a generator and which also exhibits the disadvantages of both wind and solar power outlined below (a) The method requires large areas for the mirrored arrays.

(b) The mirrors require sophisticated controls to maintain focus on the vessel as the sun moves.

(c) The plants must be located in specific arid areas with limited cloud cover in order for the plants to maintain any efficiency. These areas are usually fragile and are adversely affected by the plants as well as the construction and maintenance activity.

(d) There are reports of birds being incinerated by the focused energy.

(e) The mirrors must be constantly cleaned to maintain efficiency.

(f) The glare from focused solar arrays interferes with aircraft, particularly those near airports.

5. The present preferred alternative of producing power without using fossil or nuclear fuel is wind power. The shortcomings of wind power are enormous and distinctive:

(a) There are practical limits to the size of the propellers so the output of an individual turbine is limited, requiring large batteries of turbines to generate meaningful amounts of power.

(b) The turbines must be located in areas of high constant wind, which concentrates the wind turbines in specific regions.

(c) Because the wind farms must be located in specific regions generally far removed from population centers, new and significant transmission lines must be built at high additional cost. More rights-of-way remove more land from productive use.

(d) Winds are intermittent and variable, requiring controls to maintain or limit turbine speed and when winds drop, power output goes to zero. The power supply is thus unpredictable and undependable with history showing that wind turbines can only deliver 25% of their rated capacity over time.

(e) Because wind turbines must be spaced at large distances, wind farms demand enormous areas of land that are often isolated and pristine. They create visual pollution and because each must be accessed, roads are cut at close intervals between towers. Vast areas of virgin prairie and grassland that require centuries to recover are carved up.

(f) Wind farms drive off native big game, game birds, and birds of prey. Spinning turbine blades kill countless birds including protected species.

(g) The wind turbines generate noise that makes them impossible to live near.

(h) Wind farms occupy ground that is better used for agriculture and recreation.

The inefficiency of wind turbines are challenged in U.S. Pat. No. 4,380,419 by Morton where a method of using compressed air produced by a wind turbine in high wind periods to lift and store water from wells which on low wind periods is fed back through generators to provide a constant power supply. While suitable on a small scale it is highly impractical on a large scale. Because wind is so inefficient, huge reservoirs would be required for large wind farms, consuming even more land. Water is unavailable in many of the arid regions where wind farms are located and development costs are multiplied with wells, exploration, and construction. Water is removed for irrigation or municipal consumption. Another improvement to wind turbines is described by U.S. Pat. No. 9,030,039 by Madson again using compressed gas stored at varying pressures in vessels to be released as power is required. This innovation is unfortunately complex and expensive, both in construction and maintenance. U.S. Pat. No. 8,297,052 by Lu describes another attempt to increase the efficiency of wind power. This again requires complex and expensive additional equipment that makes wind power impractical.

6. Various means have been tried to tap the power of currents in rivers or tidal flows by placing turbine driven generators in strategic locations. This also shares the disadvantages of the other methods in addition to requiring construction of large structures that interfere with navigation and wildlife.

An alternate method of generating power is described in U.S. Pat. No. 9,041,235 by Hunter et al. as a series of submerged articulated turbines that can align with the currents, are suspended from rafts, and strung across a river. The system has the typical limitations including the need for moving water, obstruction to navigation, vulnerability to flooding and debris, and limits of scale. U.S. Pat. No. 8,987,932 by Nanayakkara focuses on power generated by deep water effects. The disadvantages of this approach have been described above and include cost of construction, limited siting, transmission losses, maintenance, navigation hazard, and hostile environment.

7. Conversion of solar radiation to electricity through photovoltaics has very limited success and is better suited for use in isolated locations to power small devices. A quick calculation shows that production of any meaningful amount of power would require covering a significant area of the continental United States with solar arrays and is simply impossible.

Some attempts have been made to address these problems and shortcomings. An alternate method of generating power is contemplated by U.S. Pat. No. 8,692,395 by Yeh wherein heavy objects are delivered to a conveyor chain around a drive gear on a generator. Gravity forces the chain downward, turning the generator while the objects pass through a magnetic field generating power for a drive motor. The obvious disadvantage to this is that most, if not all, of the generated electricity is required to power the system. A method of using wind and solar power to lift water to then drive a generator is proposed by Lewis in U.S. Pat. No. 4,311,011. During periods of excess wind or solar power that excess is used to electrolyze water into hydrogen and oxygen or into steam to later be converted. So, many energy conversions add greatly to the normal inefficiencies of wind and solar power and the mechanics are complicated and not well suited to large scale applications. Another mechanism using solar power with the principles of the real gas equation to force water to a higher elevation is described in U.S. Pat. No. 2,688,923. Large enough volumes of water to be usable for power generation are difficult to obtain. Still another method described in U.S. Pat. No. 8,878,382 by Tianchon is storing energy in rotary motion. Flywheels have been tried, abandoned, and now retried. Vacuum housings, magnetic bearings, and composite materials have been tried to deal with the historic effects of "wobble", vibration, deflection, and resonance with little success. It is unclear that such a high tech complicated method can be a useful wide spread way to store energy.

In all cases the present forms of electrical power generation require plants that must be located away from population or manufacturing centers, so there are large transmission losses. Also, when demands shift from area to area, power must be redirected through the grid so that any local failures can affect large distant areas. An alternate method of power transmission is proposed in U.S. Pat. No. 4,057,736 by Jeppson but it is questionable that the system would be anymore effective or economical than what is in use now or worth the investment.

Definitions

Shell Panel: A component that forms the outside perimeter of a chamber and fits to the top and bottom decks of the chamber. A shell panel may have one or more walls.

Wall: The inside or outside surfaces of a shell panel or by itself forms an outside perimeter of a chamber.

Chamber: A fixed volume formed by decks above and below, enclosed by walls or shell panels, divided by a movable isolation plate and filled by combinations of liquid or gas at varying pressures.

Isolation Plate: A solid movable plate contained within a chamber, shaped to fit the perimeter formed by the shell panels and decks, and containing a seal against the walls so that the plate may move within the chamber and maintain a difference in pressure on either side of the isolation plate. The isolation plate is connected to other isolation plates in other contiguous chambers by a connecting rod or rods.

Deck: General term for a component forming the top and bottom of a chamber and anchoring the shell panels.

Solid Deck: A deck that has no penetrations.

Seal Deck: A deck that has an opening for a connecting rod to pass through that connects isolation plates of contiguous chambers. The opening contains a seal against the connecting rod so that the rod may move while maintaining different pressures on either side of the deck.

Flow Deck: A deck having the features of the seal deck, the flow deck also has openings fitted with valves to allow liquid to pass through the deck from one chamber to another. The flow deck may also incorporate passages and valves to allow flow from a stage above or below it, to a detention vessel, or a supply reservoir.

Pressure Relief Deck: A deck located at the extremities of a stage and positioned so that integral flow passages allow relief air to enter and exit the chambers as the isolation plates move up and down.

Stage: A collection of three chambers arranged contiguously, complete with isolation plates, rods, seals, decks, transfer lines, pressure lines, and static pressure lines.

Lift Line: A pipe external of the chamber walls connecting specific chambers in an array of stages, either directly through the walls or through flow deck passages, so that fluid may pass from one stage to another above it.

Standpipe: A pipe external of the walls filled with a static fluid and of a height so the mass of the fluid exerts a pressure equal to or greater than atmospheric pressure and used to set chamber pressures from the top of the column.

Lift Cell: A conduit formed between the inner and outer Walls of a shell panel that allows fluid to move along the array of stages.

Standpipe Cell: A conduit formed between the inner and outer walls of a shell panel containing a static fluid of a height so the mass of the fluid exerts a pressure equal to or greater than atmospheric pressure, and used to set chamber pressures from the top of the column.

Stack: A series of stages stacked vertically and connected by a conduit or plurality of conduits so that fluid may pass from one stage to another above it.

Detention Vessel or Ring: A circular conduit or stationary vessel at the top of the stack that collects fluid from the uppermost stage and meters it through a generator.

Lift Stroke: When fluid is moving from one stage to another stage above it.

Transfer Stroke: When fluid is moving from one chamber in a stage through the flow deck to the chamber below it in the same stage.

A: Height of the volume and designation of the lower Chamber of a Stage, A=B=C.

B: Height of the volume and designation of the middle Chamber of a Stage, A=B=C.

C: Height of the volume and designation of the top Chamber of a Stage, A=B=C.

A1: Height and designation of the volume below the Isolation Plate in Chamber A.

A2: Height and designation of the volume above the Isolation Plate in Chamber A.

B1: Height and designation of the volume below the Isolation Plate in Chamber B.

B2: Height and designation of the volume above the Isolation Plate in Chamber B.

C1: Height and designation of the volume below the Isolation Plate in Chamber C.

CH: Where the chambers A=B=C are arranged side by side in a stage and a conduit connects the bottom of volume B1 to the top of volume A2; the height between the bottom of the movable plate in chamber B or top of fluid volume B1 when the movable plate is in the up most position and the invert elevation of the conduit entrance into volume A2.

C2: Height and designation of the volume above the Isolation Plate in Chamber C.

M: The mass of the Isolation Plate Assembly, complete with connecting rods.

H: The height of the fluid (water) column from the top face of the lowest Isolation Plate of one stage to the bottom face of the middle Isolation Plate of the Stage above it, or distance between Stages.

V: The distance between the bottom face of the middle Isolation Plate of a Stage to the top face of the bottom Isolation Plate of the same stage or the height of the fluid (water) mass being transferred between stages.

$P_A$: Unit atmospheric pressure or open to the atmosphere.

$P_B$: Unit boosted pressure that may be pulled from the bottom of the standpipe or provided by other means.

$P_O$: Unit pressure that is less than atmospheric pressure and may be zero and pulled off the top of the standpipe or provided by other means.

$P_M$: Unit pressure equivalent to M or mass of the Isolation Plate assembly applied to the face area of the volume of fluid (water) being transferred between Stages.

$P_V$: Unit pressure from V or height of the volume of fluid (water) within a Chamber applied to the top face of the bottom Isolation Plate in a Stage.

$P_H$: Unit pressure from H or height of the column of fluid (water) being transferred between stages.

$P_R$: Unit residual pressure exerted by fluid (water) flowing up between stages and applied to the lower face of the middle Isolation Plate of a Stage, driving the Isolation Plate assembly up. Pressure is equal to $P_A$ minus $P_H$ and $P_M$ plus incidental seal and fluid friction loss. Also designated $P_{A-(M+H)}$.

$P_G$: Unit return pressure exerted by fluid flowing from the middle Chamber through the Flow Plate to the bottom Chamber and applied to the top face of the bottom Isolation Plate driving the Isolation Plate assembly down. Pressure is equal to $P_A$ plus $P_V$ and $P_M$. Also designated $P_{A+M+V}$.

SUMMARY OF THE INVENTION

Accordingly, the object of this invention is to address and to correct as many of the disadvantages of the current methods of lifting water and generating electricity as possible.

This present invention teaches improvements in methods of lifting water or other fluid, without the use of pumps, then dropping the water through a generator to create electrical power. The improvement consists of a series of cylindrical chambers stacked vertically in a column configuration. The chambers are arranged in groups of three that comprises a stage slightly less in height than the weight of a column of water that equals the atmospheric pressure at that elevation. The three chambers are separated by decks with openings positioned to allow passage of connecting rods and capped with solid decks on the top and bottom of the stack, sealing the stage. Each chamber contains a movable isolation plate the size and shape of the chamber and sealed against the wall of the chamber with a pressure seal so the isolation plates may move up and down while maintaining pressures on either side of the isolation plates. Connecting rods connect and fix the three isolation plates together by passing through the openings in the decks separating the chambers so that the isolation plates move in unison. The isolation plates are in the same position in each chamber so that all isolation plates reach the top or bottom of the chambers at the same time. The connecting rods are sealed in the openings in the separating decks with pressure seals so that the isolation plates may move up and down while maintaining pressures on either side of the decks separating the chambers. Visualizing the three chambers in a vertical stack; the bottom chamber will be designated as 'A', the middle chamber as '13', and the top chamber as 'C'. Additionally, each chamber is divided into two volumes by the movable isolation plates so, starting at the bottom chamber 'A' the volume below the plate will be referred to as 'A1' and the volume above the plate as 'A2', in the middle chamber 'B' the volume below the plate will be referred to as 'B1' and the volume above the plate as 'B', and finally in the top chamber 'C' the volume below the plate will be referred to as 'C1' and the volume above the plate as 'C2'. As the isolation plates move up and down from the bottom of the chambers to the top of the chambers, half of the volumes as described above change from zero to maximum and the other half change from maximum to zero. For this discussion when a volume is zero it will be referred to as '0' and when it is maximum or effectively equal to the volume of the chamber it will be referred to as '1'. The deck separating the bottom chamber 'A' and the middle chamber 'B', or 'flow deck' is also fitted with valves to allow water to flow in one direction only from chamber 'B' to chamber 'A'. The plates and separating decks are shaped so that when the isolation plates are in their extreme position at the top or bottom the plates and decks fit together so there is essentially no air, space, or fluid remaining in that volume. This entire assembly as described comprises one stage and the stack is assembled from stages stacked vertically to the height desired to raise water. The stages will be referred to by Roman numerals beginning at the bottom with 'I', then 'II', then 'III', then 'IV' and so on as they increase in elevation. Additionally, there is a separate single chamber static standpipe of sufficient height that the weight of the water exceeds the atmospheric pressure and provides a vacuum at the top of the standpipe when the water is allowed to vent at the bottom. A conduit or array of conduits connect the bottom of Stage I Chamber B to a reservoir at atmospheric pressure. A conduit or array of conduits connect the top of Stage I Chamber A to the bottom of Stage II Chamber B and a conduit or array of conduits connect the top of Stage II Chamber A to the bottom of Stage III Chamber B and so on to the top of the stage assembly. A conduit or array of conduits connect the top of Chamber A of the uppermost stage to a detention vessel from which the fluid is metered out for the end use. All conduits are fitted with valves to prevent back flow. The height of all conduits are such that the weight of the column of water in the conduits exerts a pressure less than atmospheric pressure at that geographic elevation.

The operating cycle begins with all isolation plates in all stages in the down position so that volumes A1, B1, and C1 are 0 and Volumes A2, B2, and C2 are 1 or maximum. All stage volumes A2 are filled with water. All volumes C2, B1, A2, and A1 are at atmospheric pressure and volumes C1 and B2 are at static standpipe zero pressure so that the system is in equilibrium.

Lift Stroke: All volumes B1 are switched to static standpipe zero pressure so that the atmospheric pressure in Stage I, A2 forces the water to Stage II, B1 and water from Stage II, A2 to Stage III, B1 and so on. As the water flows from A2 to B1 volumes, the isolation plate assembly is pushed up until all water has flowed and the plates are at top position.

Transfer Stroke: All volumes B1 are switched to atmospheric pressure and the valves in the flow deck separating chambers A and B open allowing the water to flow into volumes A2 pushing the isolation plate assembly back down to the bottom position.

Stages may be added to create any height required, the only real limitation being structural. In the uppermost stage, during the 'Lift' stroke, fluid (water) from volume A2 is directed into a detention vessel then released through turbines to generate power. The fluid passes first through a Francis, Pelton, Kaplan, or Turgo turbine to extract the majority of the energy, then through a cross flow turbine to extract the remainder before returning to the reservoir. The lifted water may also be used to supply a reservoir, pressurize a water supply, drive a water wheel, or any number of other uses.

In an alternate embodiment of the invention where the described vacuum or near zero pressure is drawn from the top of a standpipe filled with fluid, the described atmospheric pressure may be substituted by a boosted pressure drawn from the bottom of the same or separate standpipe or in both cases by other mechanical means. In this embodiment, each stage volume C2 is connected to it's A1 by a conduit or array of conduits so that during travel of the isolation plate assembly the volumes of boosted pressure air in each of A1 and C2 are free to pass into each other while maintaining boosted pressure, A1+C2=constant, and closed to atmospheric pressure. Stage 'I' is of a height above the supply reservoir that atmospheric pressure will drive fluid into Stage 'I' volume B1 when switched to vapor or vacuum pressure. Heights between stages above Stage 'I' are increased due to the driving boosted pressure, making the system more efficient and requiring fewer stages.

In a further alternate embodiment the system as described above may be completely closed to atmospheric pressure by further maintaining the detention vessel, pen-stock line, turbines, and supply reservoir at boosted pressure further increasing efficiency.

The cycle repeats continuously. The isolation plate assembly serves several purposes, but the primary function is to make all volume transfers with incompressible fluid only.

This description provides a method of lifting water that requires no input of power, consumes no fuel, and discharges no exhaust.

It is another object of the present invention to raise water using the difference between atmospheric or boosted pressure and a lesser pressure.

It is a further object of the present invention to raise water from a continuously replenished source or from a contained supply where the discharge is returned.

It is yet another object of the present invention to use the method of lifting water to raise the water, then pass it through a turbine to drive a generator to deliver electrical power or other devices to deliver mechanical power.

It is an additional object of the present invention to provide a means of generating power by hydro-power that does not require a running source of water and recycles the same water.

It is a further object of the present invention to provide a means of generating power that once running is self sustaining.

It is yet another object of the present invention to provide a means of generating power that can be scaled for economical use in small applications and readily expanded for large scale applications so that the plants may be privately owned in residences, commercial facilities, or municipalities.

It is an additional object of the present invention to provide a means of generating power that can use common components to tailor the design output and expand output as demand increases.

It is an additional object of the present invention to provide a means of generating power that may be placed at the point of use, eliminating the need for a transcontinental transmission grid and so that excess power from one power node may be sold back and distributed regionally.

It is another object of the present invention to provide a means of generating power that consumes no fuel and emits no exhaust so that plant locations are not limited to fuel supply access, transportation costs are eliminated, and contamination is eliminated.

It is a further object of the present invention to provide a means of generating power that can be regulated according to demand and may instantaneously respond to short term spikes in demand.

It is an additional object of the present invention to provide a means of generating power that has a low visual and noise impact, and size so that plants may be located in ordinary municipal zones.

It is yet another object of the present invention to provide a means of generating power that because of zero environmental impact, does not require lengthy environmental studies or permitting processes.

It is an object of the present invention to provide a means of generating power that is not reliant on erratic renewable power sources in order to eliminate visual pollution and consumption of large acreages of ground.

It is another object of the present invention to provide a means of generating power that may be located in populated areas to eliminate disruption and destruction of wildlife.

It is yet an additional object of the present invention to provide a means of generating power that is mechanically simple with few moving parts, requiring minimal maintenance and operating attention.

It is a further object of the present invention to provide a means of generating power that can be constructed using low strength low temperature poly carbonate materials thus diverting coal, oil, and natural gas into a permanently available resource rather than being permanently destroyed as a fuel.

It is an additional object of the present invention to provide a means of generating power that can be constructed from repetitive use of a small number of mass produced components making power plants economically available on a mass scale.

It is an object of the present invention to provide a means of generating power that can be owned and operated by municipalities, corporations, and individuals and act as power generating nodes on the grid that can send excess power back into the grid.

It is another object of the present invention to provide a means of generating power that when spread throughout the electrical grid, provides a grid where failure of a generating node can be compensated for by other nodes.

These and other objects of the present invention will become apparent to those skilled in the art from the following detailed description showing the contemplated novel construction, combination, and elements as herein described, and more particularly defined by the appended claims, it being understood that changes in the precise embodiment to the herein disclosed invention are meant to be included as coming within the scope of the claims, except as they may be precluded by the prior art.

BRIEF DESCRIPTION OF THE DRAWINGS

FIG. 20 presents a perspective view of a model of a stack with internal lift and standpipe cells contained within the walls of the chambers.

FIG. 21 is a longitudinal section of a model of a stack with internal lift and standpipe cells through a standpipe cell and in the 'Transfer' stroke.

DESCRIPTION OF THE PREFERRED EMBODIMENTS

Figure 1A:
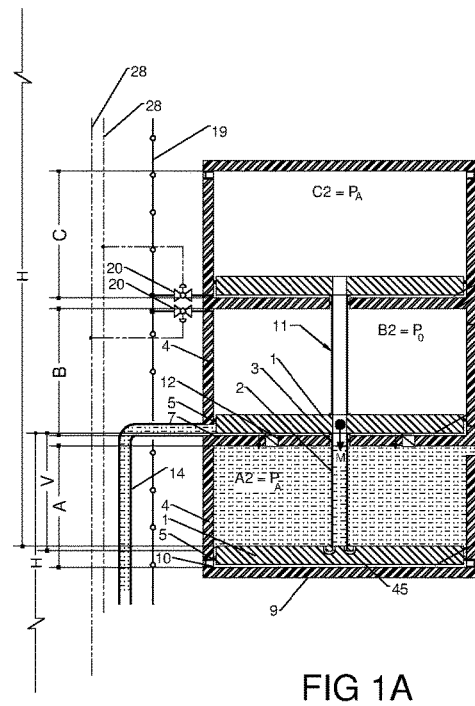
FIG. 1A is a schematic view of a single stage with vertically stacked chambers showing the static state at the end of the Transfer stroke and before the start of the 'Lift' stroke.

The preferred embodiment of the fluid lift assembly may best be understood by referring to the schematic diagrams in FIG. 1A, FIG. 1B, FIG. 1C, and FIG. 1D that depict a single stage comprised of three vertically stacked chambers consisting of walls, seal decks, flow deck, relief pressure decks, an isolation plate assembly, pressure lines, valves and seals. The cycle begins with the FIG. 1A configuration. Isolation plate assembly 11; comprised of isolation plates 1 with seals 5 against chamber walls 4, and connecting rods 2 against seals 3 in decks 6 and 7 is at rest in the bottom most position with all fluid contained in volume A2 except for incidental fluids in lines stopped by valves 12. Volumes A1, B1, and C1 are minimum or essentially zero. At this point, low pressure or vacuum valve 20 to volume C1, attached to low pressure or vacuum line 19 from the top of standpipe or other low pressure (vacuum) source cycles to maintain low (zero) pressure in volume C1 should there be any seal leakage. Valves 21, connected to the atmospheric pressure source and 20, connected to the system standpipe or other low (zero) pressure source are actuated by control lines 28. Volumes A1, A2, B1, and C2 are at atmospheric pressure while volumes B2 and C1 are at $P_O$ or 'zero' pressure so that the system is static and in balance. Pressure relief ports 10 in pressure relief decks maintain atmospheric pressure in volumes A1 and C2.

Figure 1B:
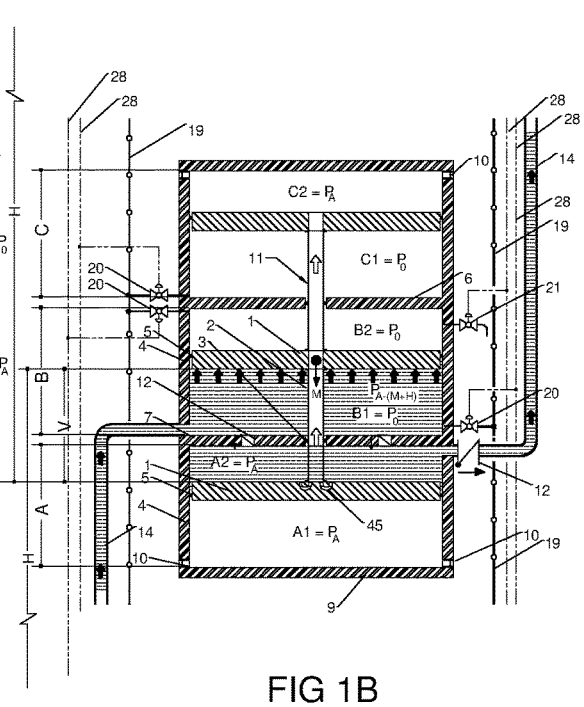
FIG. 1B is a schematic view of a single stage with vertically stacked chambers showing the initiation and process of the 'Lift' stroke.

The events depicted in FIG. 1B are set in motion by switching the pressure in volume B1 of all stages from atmospheric $P_A$ to low or zero pressure $P_O$ by means of valve 20 through low (zero) pressure line 19 while the isolation plate assembly 11 is at the bottom position and volume B1 is essentially zero. Lift lines 14 connect volume A2 of this stage to volume B1 of the stage above and connect volume B1 of this stage to volume A2 of the stage below. Valves 12 in flow deck 7 are closed to prevent flow between volume A2 and B1 of the same stage. Atmospheric pressure in volume A1 and from volume C2 down through the isolation plates, hollow rods, and through ports 45 to volume A2 now drives the fluid in volume A2 of this stage through fluid transfer tube 14 to volume B1 of the stage above. Residual pressure $P_{A-(M+H)}$ applied to the bottom face of the chamber B isolation plate 1 drives the isolation plate assembly 11 of all stages up simultaneously as fluid moves from volumes A2 to B1 of contiguous stages. FIG. 1B is defined as the 'Lift' stroke.

Figure 1C:
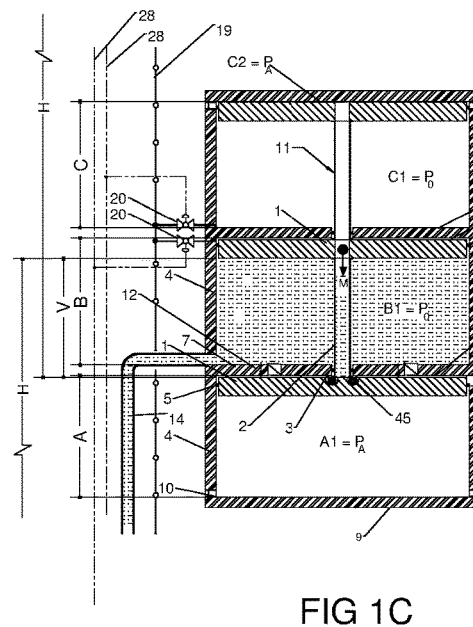
FIG. 1C is a schematic view of a single stage with vertically stacked chambers showing the static state at the end of the 'Lift' stroke and before the start of the 'Transfer' stroke.

FIG. 1C is the top of the 'Lift' stroke. Volumes A2, B2, and C2 are all at minimum or essentially zero. Valve 20 to volume B2 and from low pressure or vacuum line 19 cycles to maintain low (zero) pressure in B2 should there be any seal leakage. All fluid in all stages is now in volumes B1 except for fluid above valves 12 and the system is at rest.

Figure 1D:
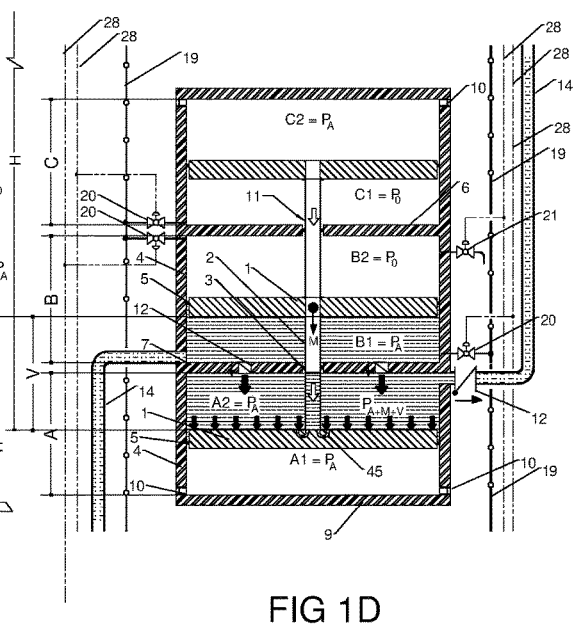
FIG. 1D is a schematic view of a single stage with vertically stacked chambers showing the initiation and process of the 'Transfer' stroke.

The 'Transfer' stroke depicted in FIG. 1D is initiated by opening relief valve 21 and letting atmospheric pressure into volumes B1. Volumes B, A2, and A1 are now all at atmospheric pressure. Valves 12 in flow deck 7 open to allow the fluid to transfer from volume B1 to volume A2 of the same stage. Pressure $P_{A+M+V}$ applied to the top face of the chamber A isolation plate 1 drives the isolation plate assembly 11 down to the FIG. 1A position. Valves in relief port 10 opening into volumes A1 modulate to control air discharge and regulate the rate of the isolation plate assembly 11 descent. When the isolation plate assembly 11 reaches the bottom position, volumes A1, B1, and C1 are now at minimum or essentially zero. Valve 20 to volume C1 and from low pressure or vacuum line 19 cycles to maintain low (zero) pressure in C1 should there be any seal leakage.

Figure 2A:
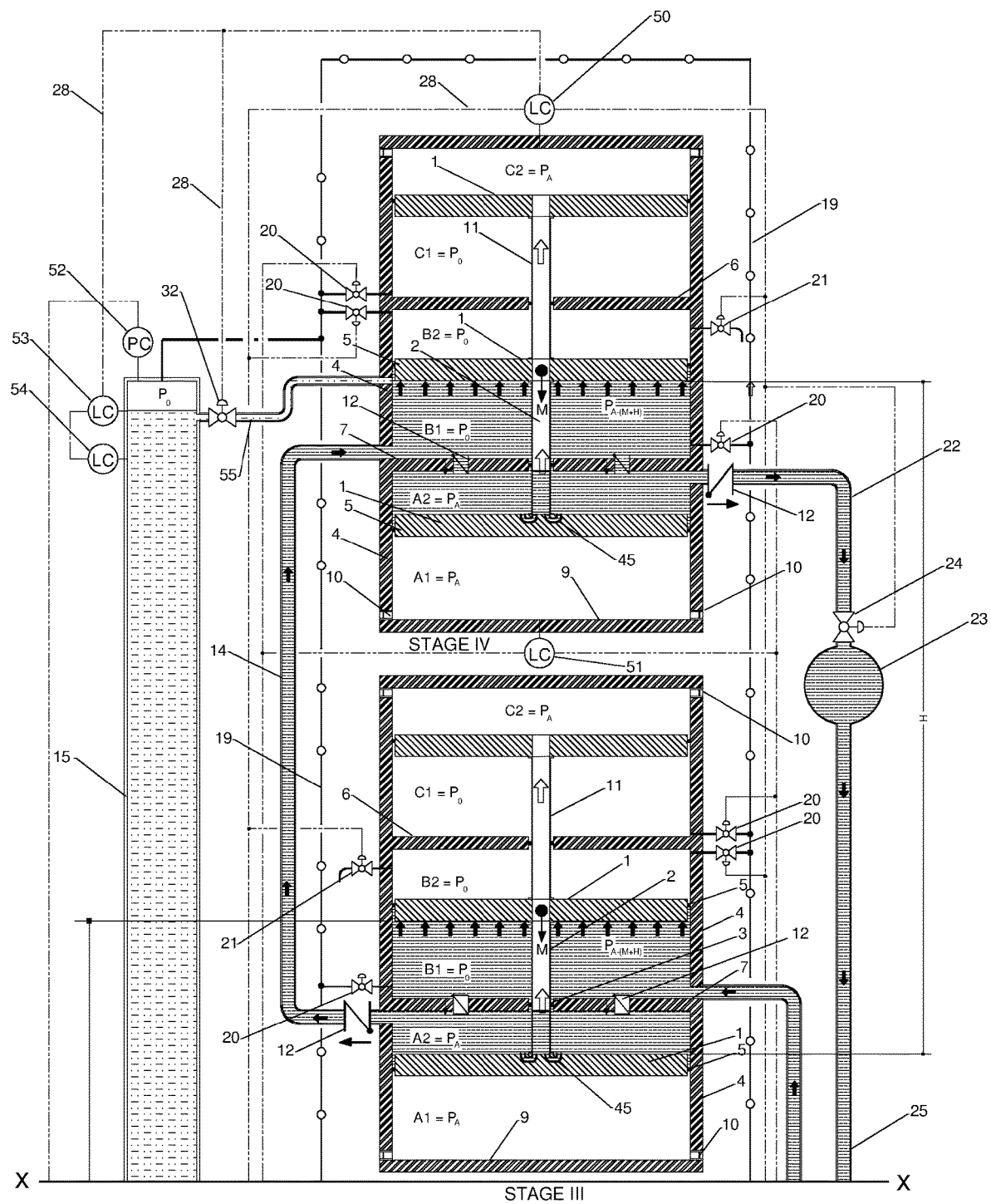
FIG. 2A is a schematic view of the top half of a column of stages with a match line to a schematic view of the bottom half of a column of stages represented in FIG. 2B, both in the 'Lift' stroke.
Figure 2B:
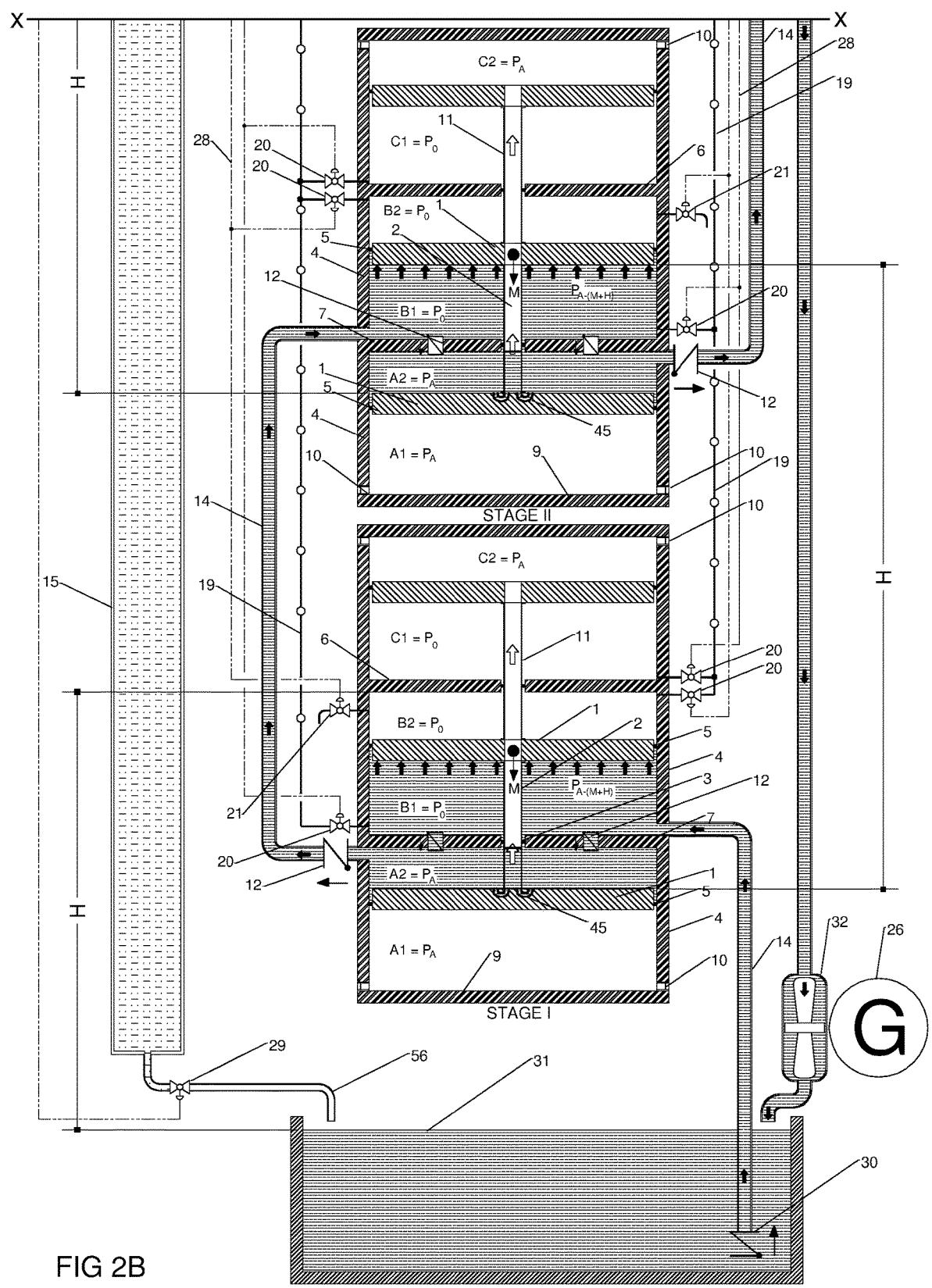
FIG. 2B is a schematic view of the bottom half of a column of stages with a match line to a schematic view of the top half of a column of stages represented in FIG. 2A, both in the 'Lift' stroke.

The function of a stack or vertical array of stages can best be understood by referring to schematic FIG. 2A and FIG. 2B considered together along match line X-X. The stack in the figures is in the 'Lift' stroke, so all isolation plate assemblies 11 in all stages are traveling up as fluid moves into volumes B1 as described in the FIG. 1 commentary. Other elements of the embodiment are shown. The stages are connected by fluid lift lines 14 with a valve 12 at the base of each and Stage I is supplied by a lift line 14 fitted with a foot valve 30 into reservoir 31. A standpipe 15 of a height sufficient to deliver low or zero pressure from the top provides the pressure to valves 20 and valve actuators through pressure lines 19. Referring to the uppermost Stage IV, the discharge from volume A2, instead of rising to a higher stage, is run through valve 12, discharge line 22, shut off valve 24, and into detention vessel 23. Vessel 23 is located below solid deck 9 under volume A1 of Stage IV so that siphon action reduces unit pressure to chamber A isolation plate and improves flow during the lift. Detention vessel 23 stores enough fluid to last through both 'Lift' and 'Transfer' strokes when metered out through pen-stock line 25 to turbine 32 driving generator 26 and back into reservoir 31. Topping line 55 leads to standpipe 15 through topping valve 32 from volume B1 or alternately from detention vessel 23 and bleed off line 56 leads from the bottom of the standpipe through bleed valve 29 to reservoir 31. When isolation plate assemblies 11 reach the top of chamber and all volumes A2, B2, and C2 are at minimum (zero), level control 50 senses the position and checks standpipe fluid level through level control sensor 54. If low, before volume B1 is switched to pressure PA, topping valve 32 is opened and the standpipe is filled through topping line 55 until level control sensor 53 closes topping valve 32 while simultaneously, shutoff valve 24 is closed and valve 12 in discharge line 22 traps the fluid in the line while valve 20 in low pressure line 19 to volume B2 cycles to refresh the low (zero) pressure. Pressure control sensor 52 continuously monitors the top of stand pipe pressure and modulates bleed valve 29 to let off fluid back into reservoir 31 and maintain operating pressure. The sequence ends by relief valves 21 letting atmospheric pressure into volumes B1 of all stages leading to the 'Transfer' stroke.

Figure 3A:
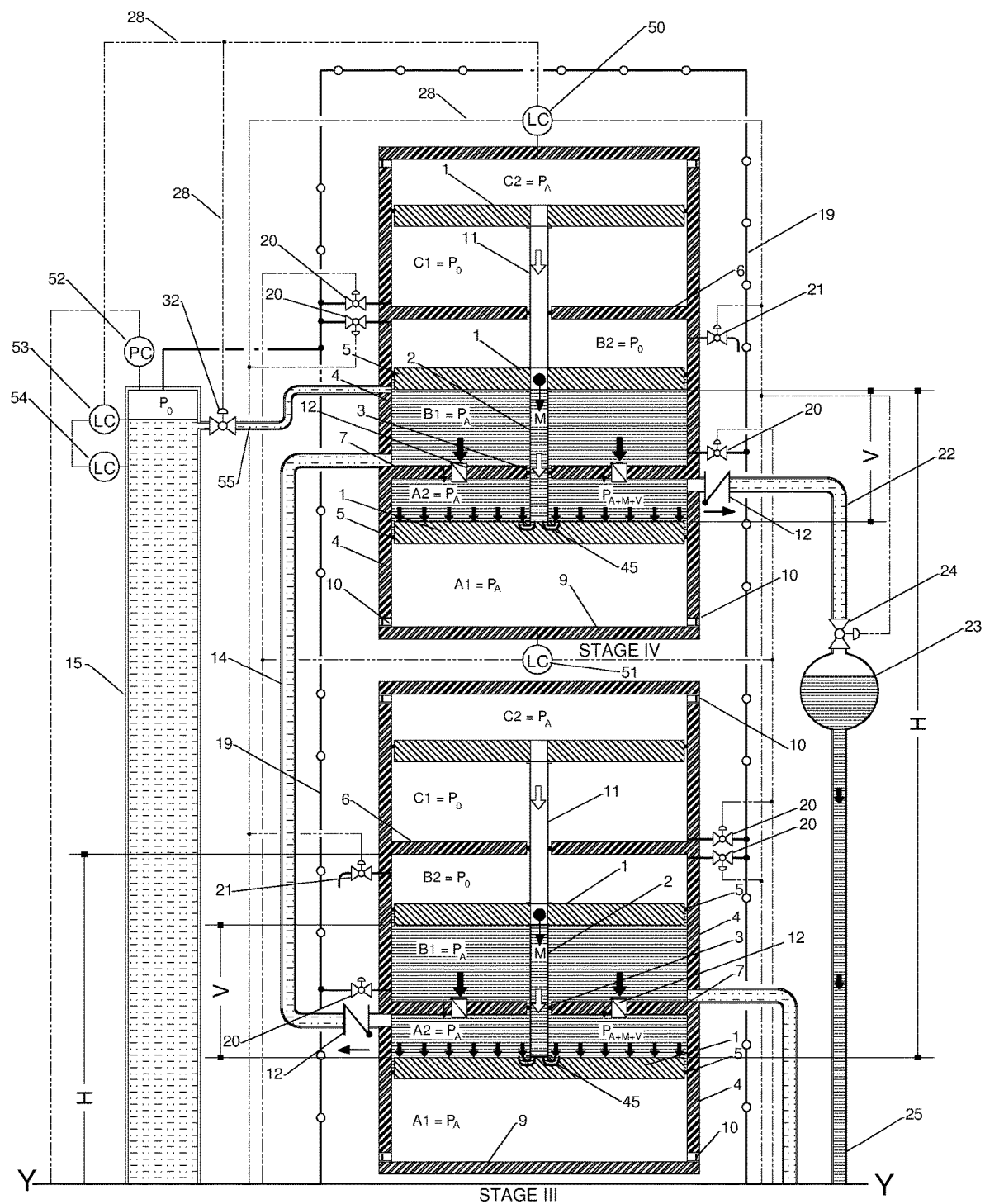
FIG. 3A is a schematic view of the top half of a column of stages with a match line to a schematic view of a bottom half of a column of stages represented in FIG. 3B, both in the 'Transfer' stroke.
Figure 3B:
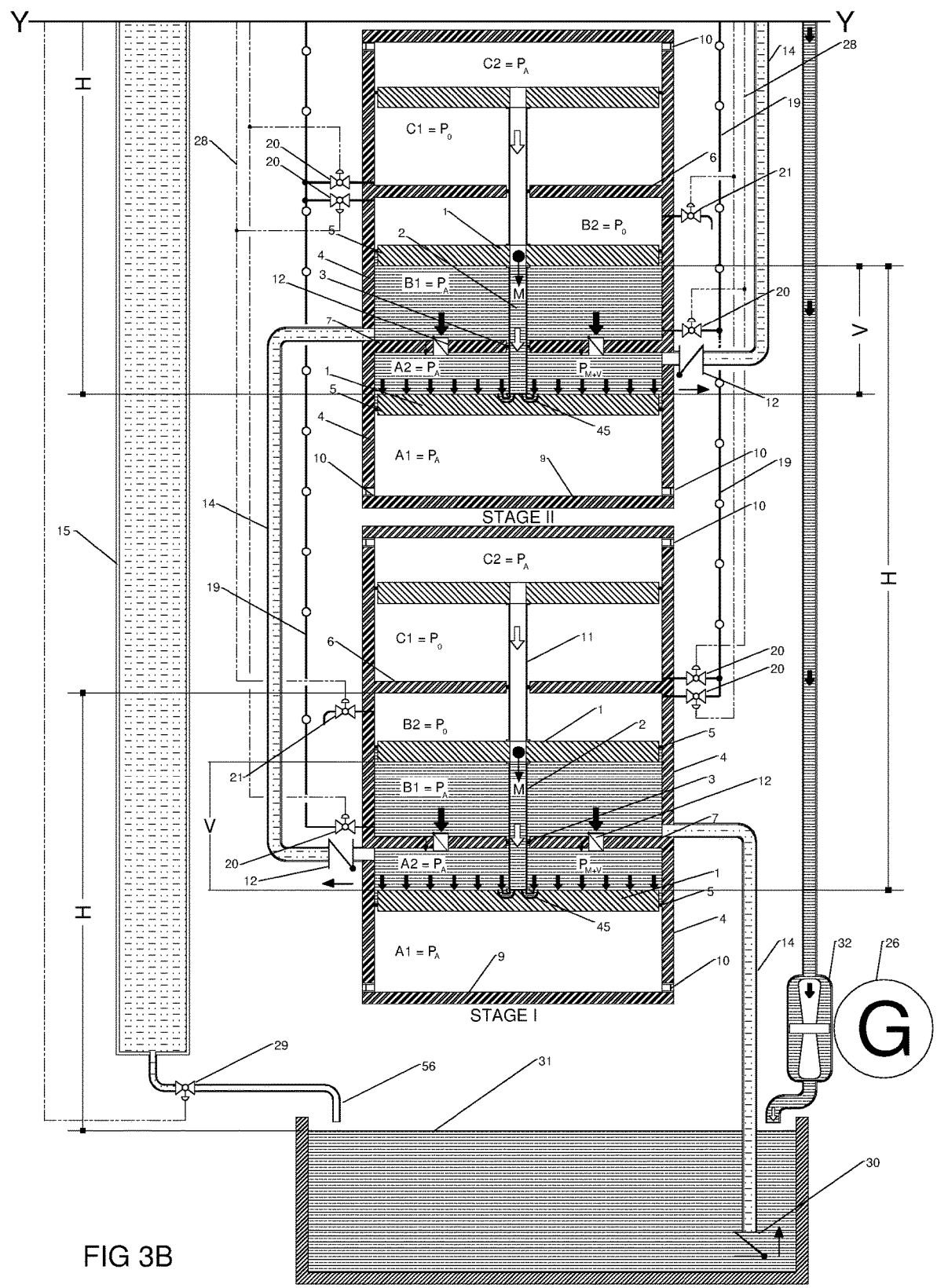
FIG. 3B is a schematic view of the bottom half of a column of stages with a match line to a schematic view of a top half of a column of stages represented in FIG. 3A, both in the 'Transfer' stroke.

The 'Transfer' stroke can be understood by referring to schematic stack diagrams of FIG. 3A and FIG. 3B together along match line X-X. The fluid in lift lines 14 is static and held in place by valves 12. The fluid in discharge line 22 is held between valvel 2 and shutoff valve 24. Fluid pressure now opens valves 12 in flow decks 7 so that all fluid transfers from Volumes B1 to volumes A2 of the same stages, driving the isolation plate assemblies down at a velocity regulated by modulating air relief port valves 10. Fluid continues to be metered from detention vessel 23 through penstock line 25 to turbine 32 and back to reservoir 31 during the 'Transfer' stroke. When the isolation plate assembly 11 reaches the bottom position and all volumes A1, B1 and C1 are zero, level control sensor 51 cycles valve 20 from low (zero) pressure line 19 to volume C1 to refresh the pressure, then simultaneously opens valve 20 from low (zero) pressure line 19 to volume A1 and shut off valve 24 to detention vessel 23 to begin the 'Lift' stroke.

Figure 4:
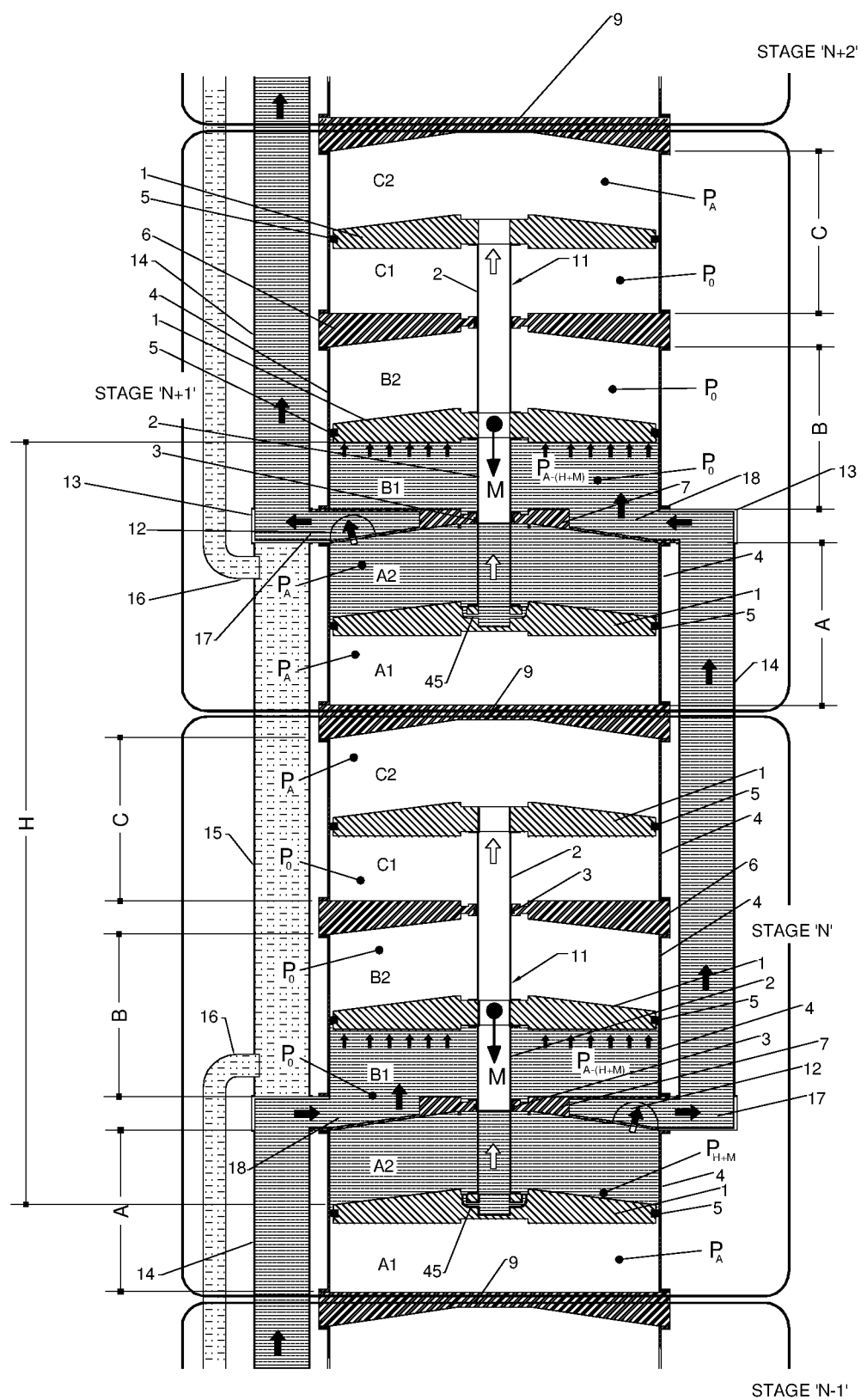
FIG. 4 is a diagram of a midsection of a functional configuration of a column of stages or stack with external lift and integrated standpipe lines in the 'Lift' stroke.
Figure 5:
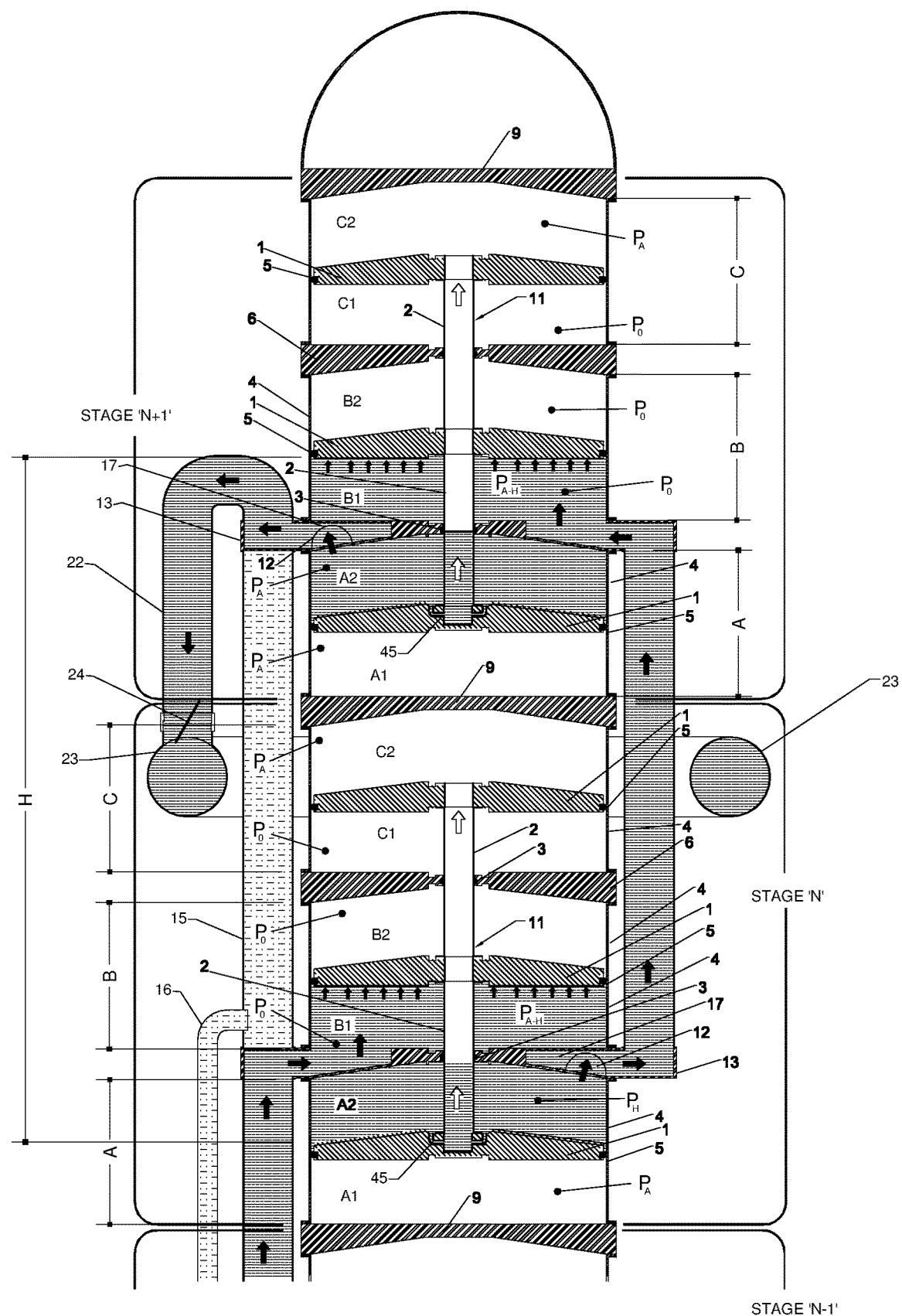
FIG. 5 is a diagram of the top section of a stack with external lift and integrated standpipe lines in the 'Lift' stroke.
Figure 6:
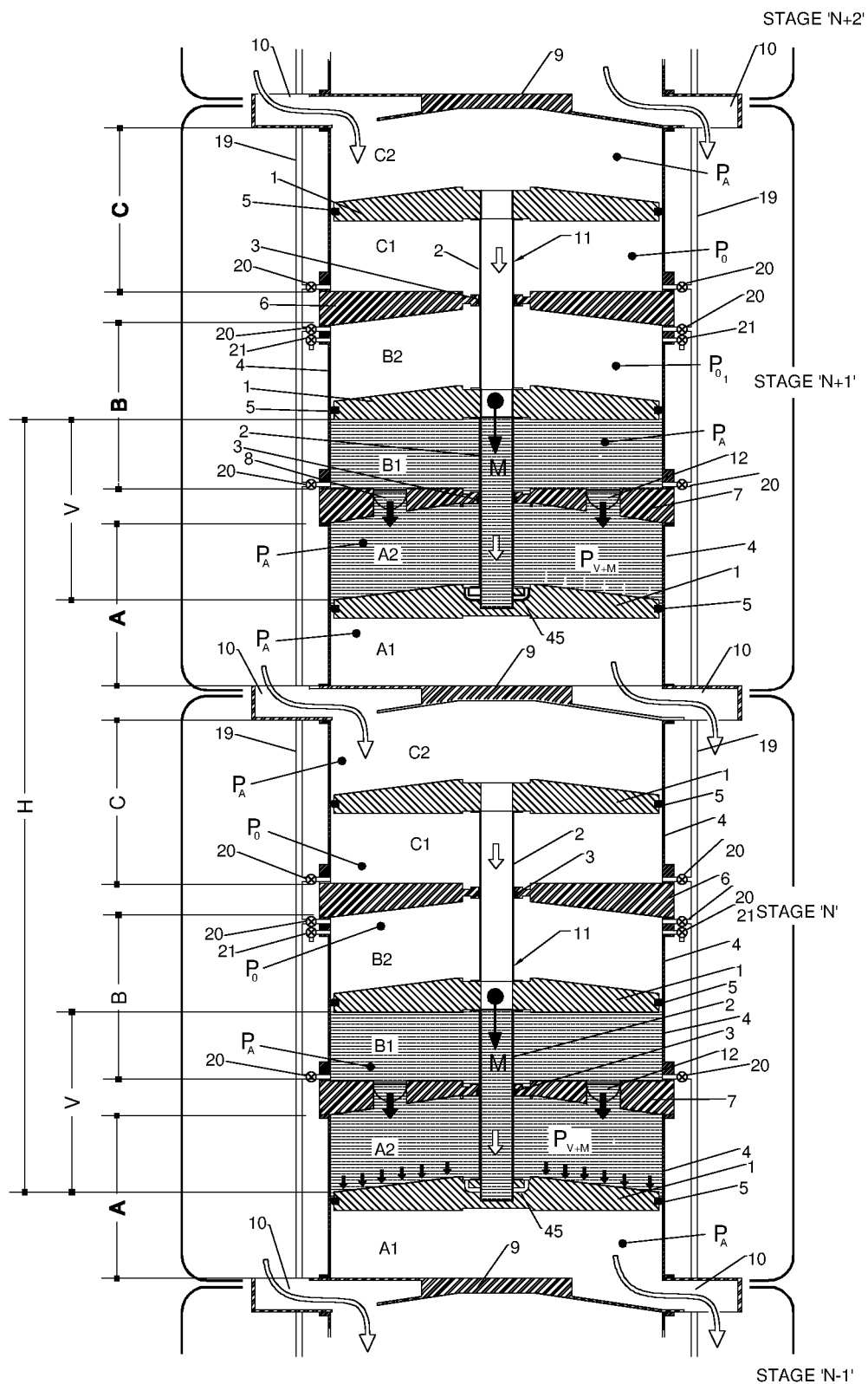
FIG. 6 is a diagram of a midsection of a stack with external lift and integrated standpipe lines in the 'Transfer' stroke.
Figure 7:
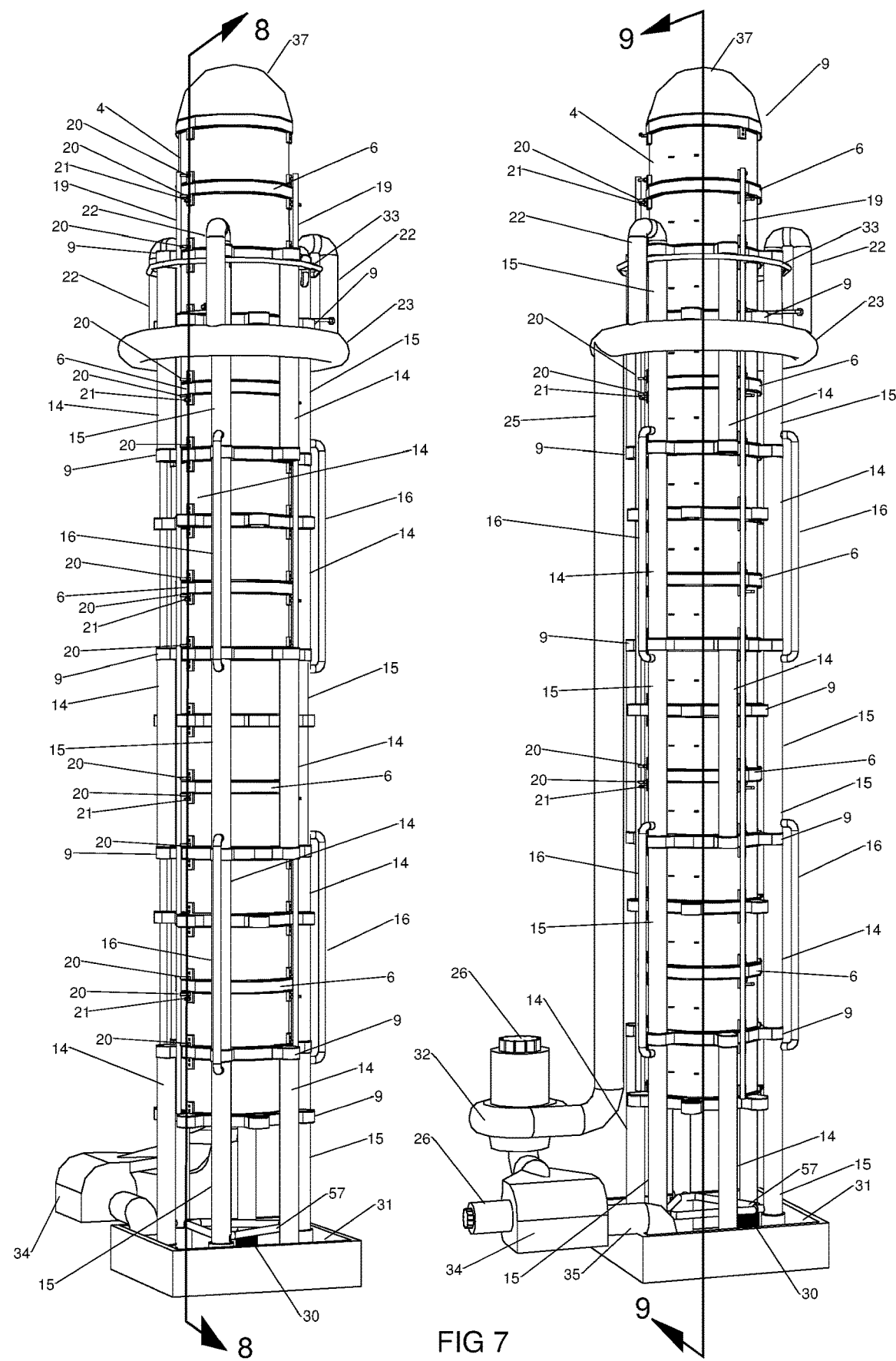
FIG. 7 presents perspective views from two different angles of a model of a stack with external lift and integrated standpipe lines indicating section views FIG. 8 and FIG. 9 through the column.

A practical construct of the embodiment is contemplated in sections FIG. 4 and FIG. 5 where isolation plates 1 and decks 6, 7, and 9 are shaped for structural efficiency, ease of seal installation and replacement, and to nestle together to achieve near zero volume between them at the top and bottom positions of the isolation plate assembly 11 travel. Maximum lift height between stages is maintained by forming inlet chambers 18 to volumes B1 and outlet chambers 17 from volumes A2 within the heights of flow decks 7. Valves 12 are housed in outlet chamber 17 to prevent fluid from flowing back during the 'Transfer' stroke. The chambers 17 and 18 are adjoined by terminal boxes 13 that connect lift lines 14 and direct fluid flow to the chambers. In this embodiment, a plurality of chambers 17 and 18 with terminal boxes 13 are arranged alternately and at equal spaces in a polar array around a circular flow deck. By rotating the identical flow decks relative to each other in alternating stages, the outlet chamber 17 of one stage will align with the inlet chamber 18 of the stage above it so that an array of lift lines between contiguous stages will be rotated incrementally from the stage above or below it. FIG. 6 depicts the system during the 'Lift' stroke so fluid is flowing upward between stages through the lift lines 14 and in this configuration, the active lift lines between stages are rotated relative to each other so that a standpipe line segment 15 may be installed between them and connected by a bypass line 16 to develop full pressure. FIG. 7 depicts a section of the top of the stack where the terminal boxes 13 from outlet chambers 18 to volume A2 of the upper most stage connect to discharge lines 22 through shut off valves 24 and into detention vessel 23 where fluid is metered out to the turbines.

FIG. 6 represents an embodiment where solid deck 9 between stages is replaced by a flow deck 7 rotated relative to other flow decks so that inlet chamber 17, outlet chamber 18, and terminal boxes 13 clear the lift lines and standpipe lines. The terminal boxes with inlet and outlet chambers serve as air relief ports as the isolation plate assembly 11 moves up and down. The assembly in FIG. 6 is in the 'Transfer' stroke so valve 12 in transfer port 8 is open and fluid is flowing from volume B1 to volume A2 in the same stage.

Figure 9:
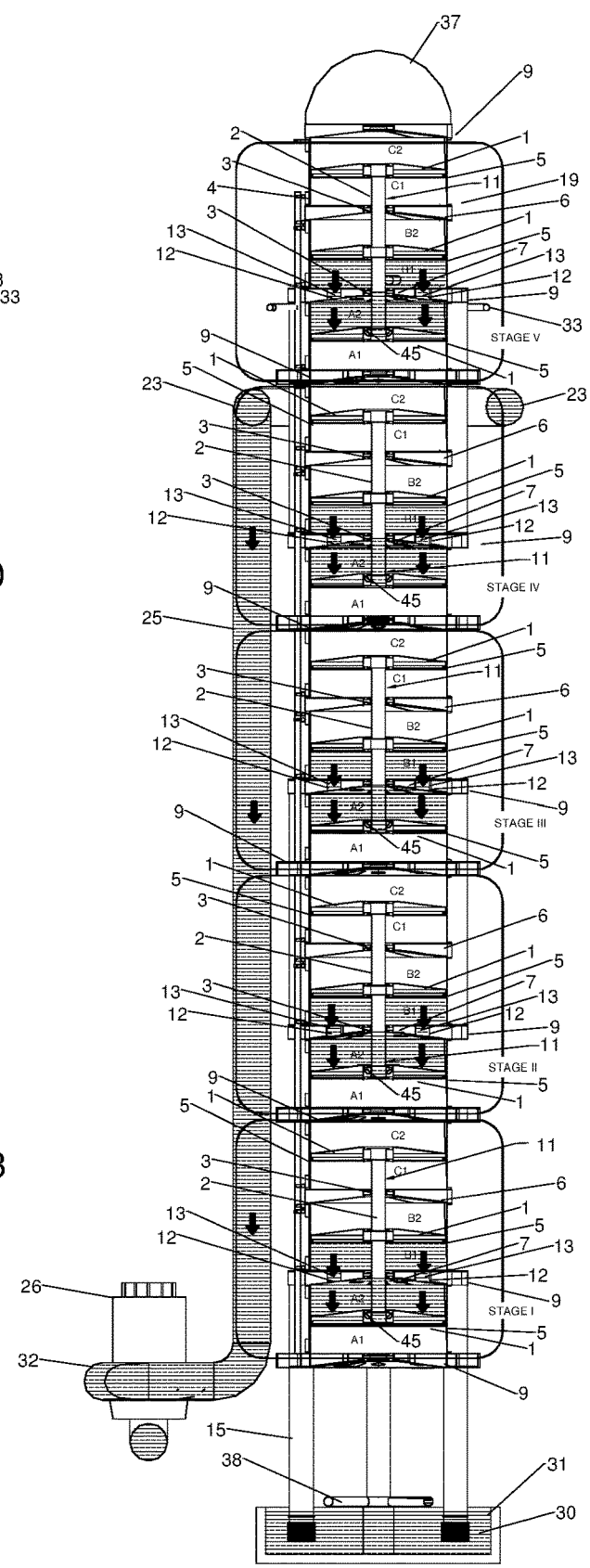
FIG. 9 is a section cut according to FIG. 7 through a stack with external lift and integrated standpipe lines showing the apparatus during the 'Transfer' cycle.

The previous descriptions may be better understood by examining the exterior perspectives of FIG. 7. The arrangements of lift lines 14, standpipe line segments 15, and bypass lines 16 can be seen. In this configuration, the decks 6, 7, 9, isolation plates 1, and chamber shells 4, are each formed by a number of identical pieces, in this case forming a round structure. Each stage has a number of lift lines 14 rising to the stage above and a number of lift lines 14 arriving from the stage below. Each set is rotated a set degree relative to each other and are spaced uniformly around the stages. There is space between lift lines 14 of alternating stages to fit standpipe line segments 15 connected by bypass lines 16. Terminal boxes 13 separate fluids in the standpipe and lift lines. Low pressure lines 19 and valves 20 are spaced around the stack and connected to a pressure distribution ring 33 tapped into the top of the standpipes. The bottom of the standpipes are connected by a leveling ring 38 to balance fluid levels and accommodate bleed off valve 29. At the top stage, the discharge lines 22 feed the detention ring 23 from which fluid is metered through pen-stock line 25 to turbines 32 and 34 driving generators 26. The effluent passes first through a Francis, Pelton, Turgo, or Kaplan turbine to extract the majority of the energy then through a cross flow turbine to extract the last energy of the now slow moving fluid before it re-enters the reservoir 31. Sections cut on FIG. 9 are represented as FIG. 10 and FIG. 11.

Figure 8:
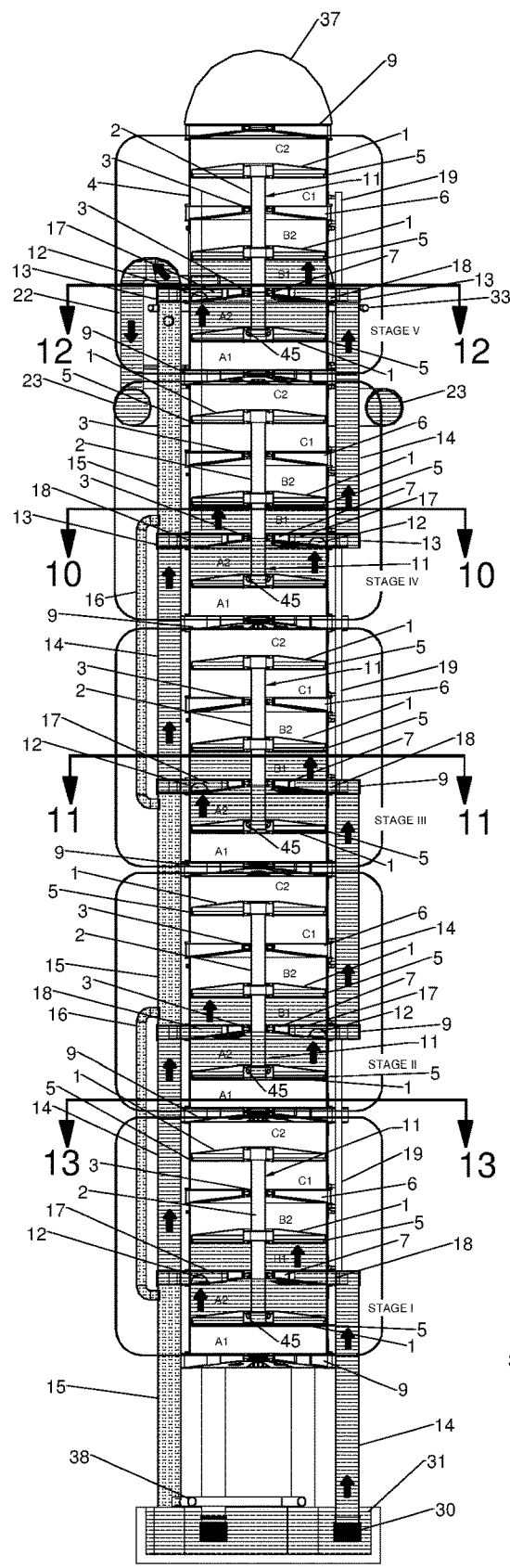
FIG. 8 is a longitudinal section cut according to FIG. 7 through a stack with external lift and integrated standpipe lines showing the apparatus during the 'Lift' cycle and indicating sections shown in FIG. 10, FIG. 11, FIG. 12, and FIG. 13.

FIG. 8 depicts the stack in the 'Lift' stoke and clarifies the relationship of the standpipe segments 15, lift lines 14, and bypass lines 16. Flow from the top stage through discharge line 22 and to detention vessel 23 can be seen. Cross sections are indicated on FIG. 8 as FIG. 10, FIG. 11, FIG. 12, and FIG. 13 and considered together will help explain the configuration. FIG. 9 is a section at a slightly different angle illustrating the 'Transfer' stroke and flow through the pen-stock line 25 to turbine 32.

Figure 10:
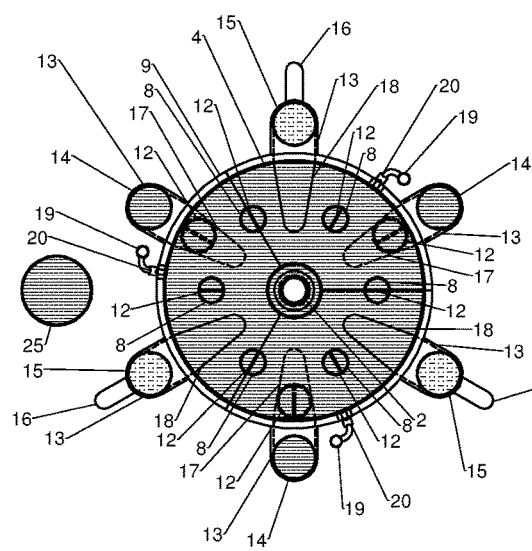
FIG. 10 is a section cut according to FIG. 8 through a stack with external lift and integrated standpipe lines at the standpipe line location.

FIG. 10 is a section cut below the isolation plate through volume B1 looking down on flow deck 7. Fluid is flowing from volume A2 below the deck through inlets 17 facing into volume A2, open valves 12, terminal boxes 13, and up lift lines 14 to the stage above. Fluid is flowing into volume B1 through outlets 18 opening into volume B1. Lift lines to the stage below run down from the terminal boxes 13 and standpipe segments 15. Bypass lines 16 run down from this standpipe segment to the standpipe segment located the second stage below. Valves 12 in transfer ports 8 are closed. Fluid is flowing down pen-stock line 25 to turbines below.

Figure 11:
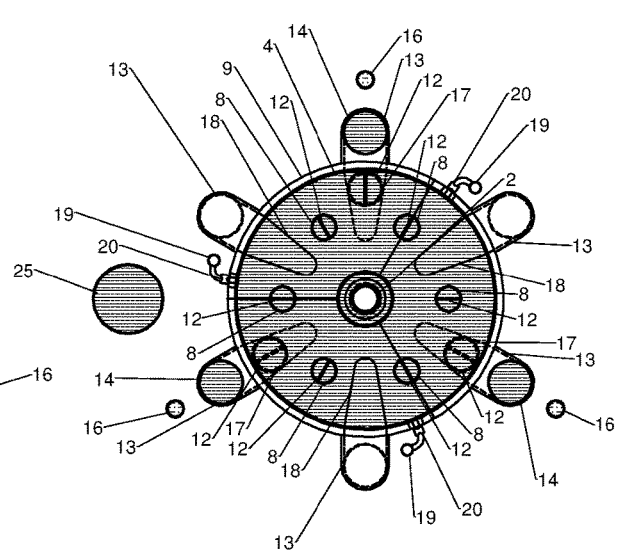
FIG. 11 is a section cut according to FIG. 8 through a stack with external lift and integrated standpipe lines between the standpipe lines locations.

FIG. 11 is a section cut below the isolation plate through volume B1 looking down on flow plate 7. The flow plate of FIG. 11 is rotated relative to the flow plate of FIG. 10 so that the inlet 17 of this stage lines up with the outlet 18 of the stage above. Fluid is flowing from volume A2 below the deck through inlets 17 facing into volume A2, open valves 12, terminal boxes 13, and up lift lines 14 to the stage above. Fluid is flowing into volume B1 through outlets 18 opening into volume B1. Lift lines to the stage below run down from the terminal boxes 13 and standpipe segments 15. Bypass lines 16 run up alongside of lift lines 14 to the standpipe segment 15 above. Valves 12 in transfer ports 8 are closed. Fluid is flowing down pen-stock line 25 to turbines below.

Figure 12:
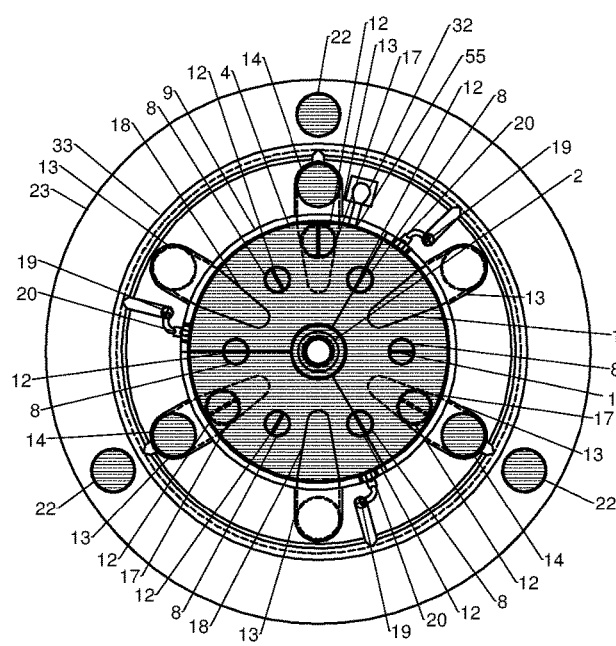
FIG. 12 is a section cut according to FIG. 8 through a stack with external lift and integrated standpipe lines above the collection ring location.

FIG. 12 is a section cut below the isolation plate through volume B1 looking down on flow plate 7. The flow plate of FIG. 12 is rotated relative to the flow plate of FIG. 10 so that the outlet 18 of this stage lines up with the inlet 17 of the stage below. Fluid is flowing from volume A2 below the deck through inlets 17 facing into volume A2, open valves 12, terminal boxes 13, and up to the discharge lines 22 and to detention ring 23. Fluid is flowing into volume B1 through outlets 18 opening into volume B1. Lift lines to the stage below run down from the terminal boxes 13. Topping line 55 runs from volume B1 to topping valve 32 and into the standpipe below and pressure distribution ring 33 tapped into the standpipes delivers low pressure to pressure lines 19 and valves 20. Valves 12 in transfer ports 8 are closed.

Figure 13:
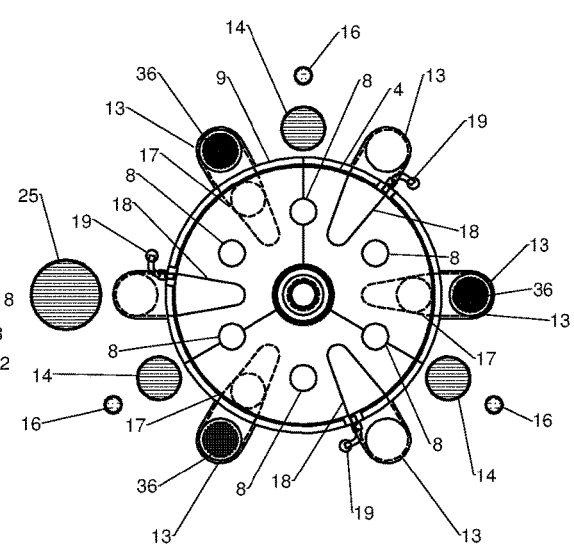
FIG. 13 is a section cut according to FIG. 8 through a stage column configuration with external lift and integrated standpipe lines at the pressure relief deck between stages.

FIG. 13 is a section cut below the isolation plate through volume A1 looking down on flow plate 7. The flow plate is rotated relative to the other flow plates so the terminal boxes 13 of this flow plate clear all lift lines, standpipes, and bypass lines. Terminal boxes 13 are fitted with screens 46, open to the atmosphere, so the plate acts as an air relief feature according to the FIG. 6 dialogue.

Figure 14:
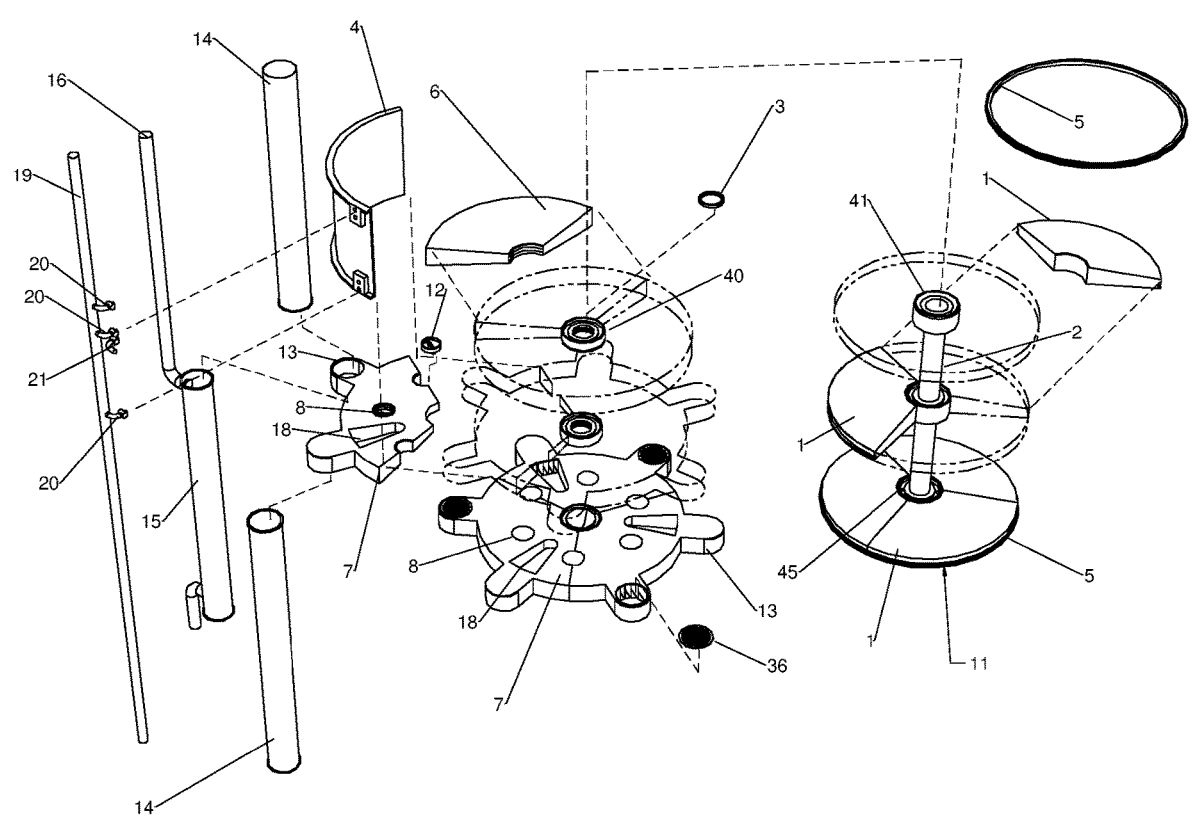
FIG. 14 is an exploded perspective view of typical stage components for a stage with external lift and integrated standpipe lines.
Figure 15:
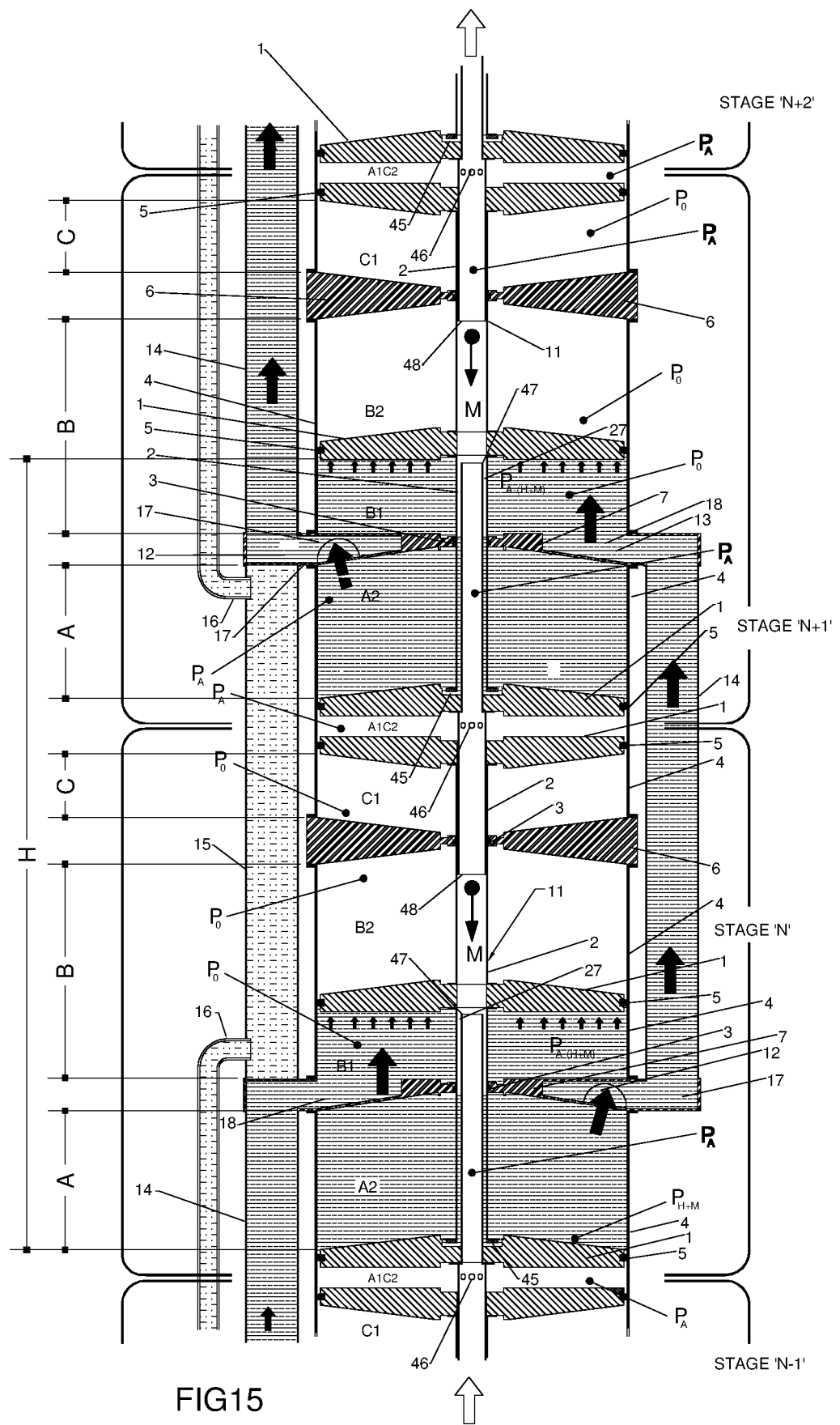
FIG. 15 is a diagram of a midsection of a shared chamber stack with external lift and integrated standpipe lines in the 'Lift' stroke.
Figure 16:
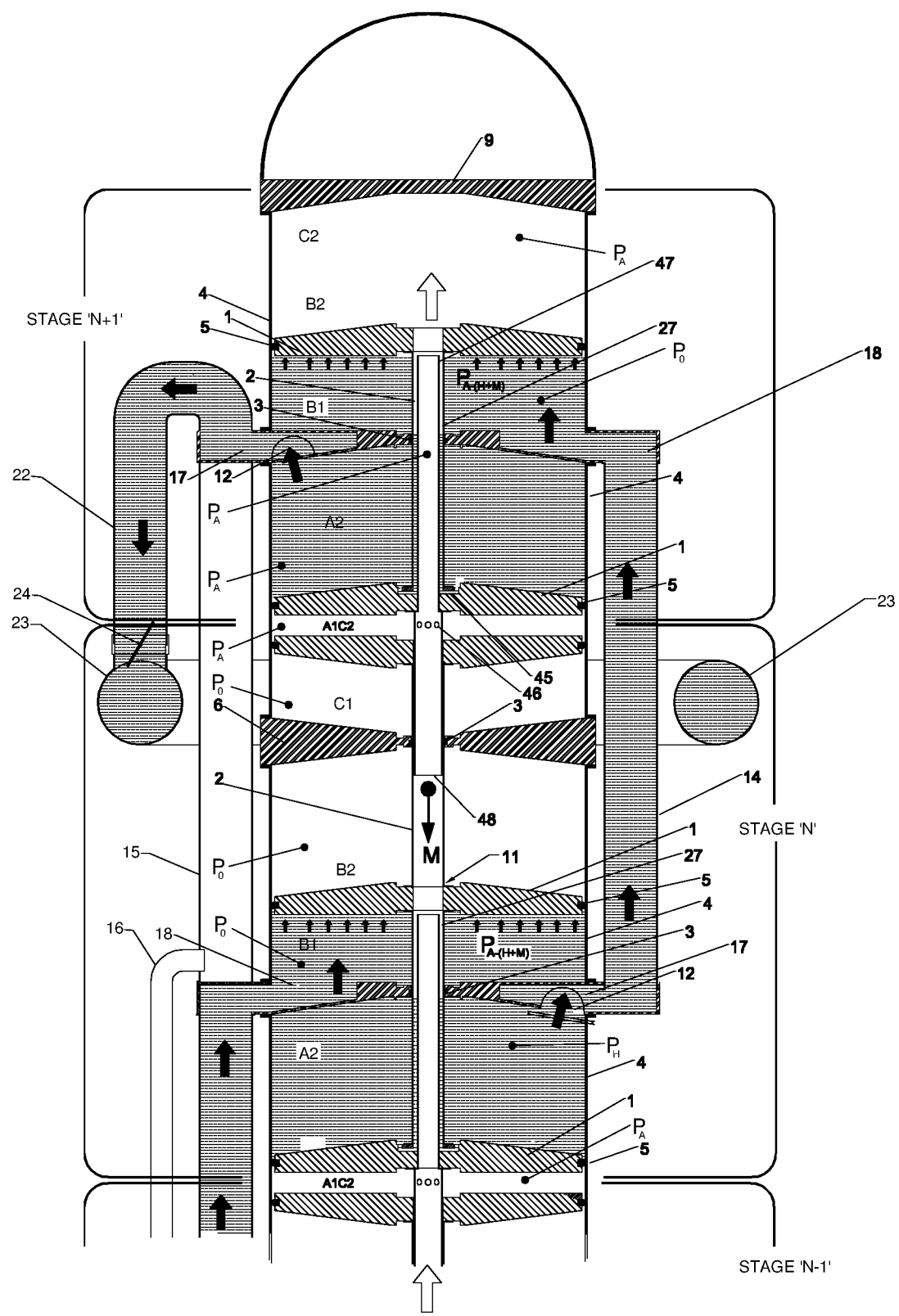
FIG. 16 is a diagram of a top section of a shared chamber stack with external lift and integrated standpipe lines in the 'Lift' stroke.
Figure 17:
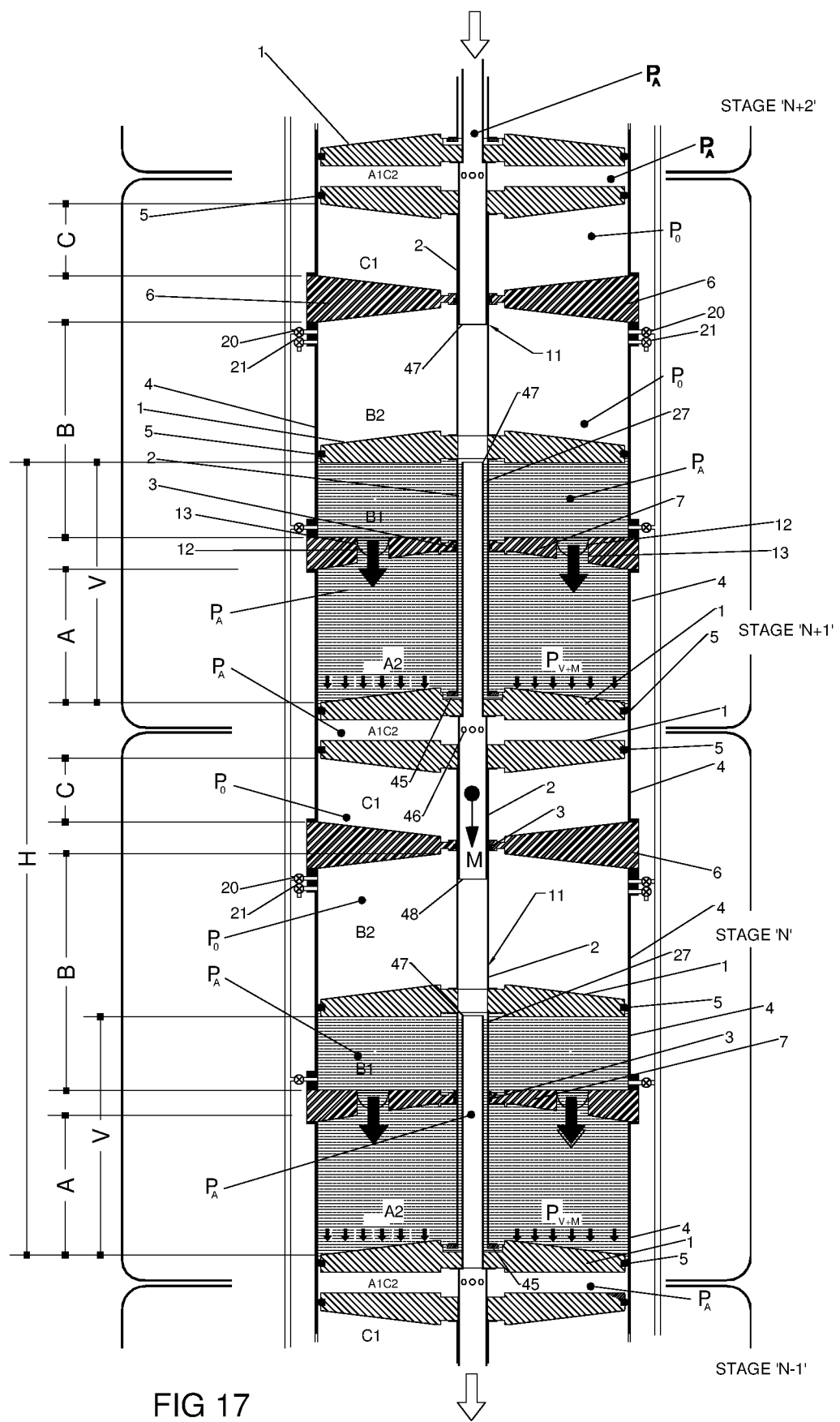
FIG. 17 is a diagram of a middle section of a shared chamber stack with external lift and integrated standpipe lines in the Transfer stroke.
Figure 18:
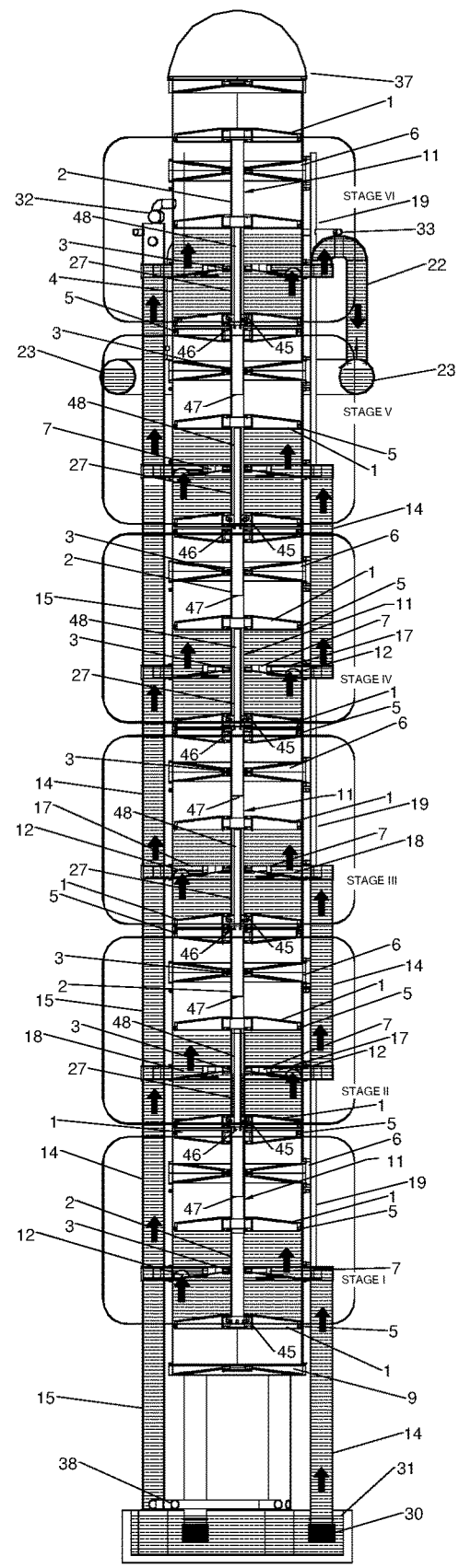
FIG. 18 is a longitudinal section of a model of a shared chamber stack with external lift and integrated standpipe lines in the 'Lift' stroke.
Figure 19:
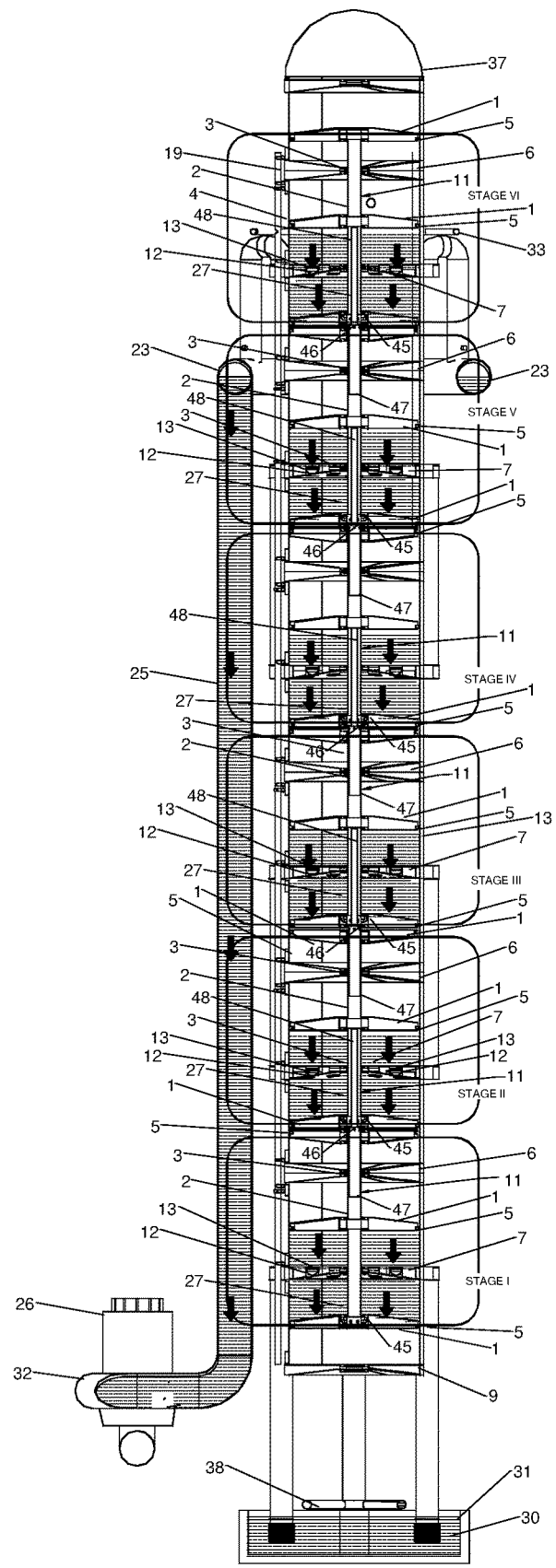
FIG. 19 is a longitudinal section of a model of a shared chamber stack with external lift and integrated standpipe lines in the Transfer stroke.

FIG. 14 is an exploded perspective view of a stage of the currently considered embodiment. Identical segments are joined to form complete seal decks 6 and flow decks 7, both to control flows in and out of the stage and to provide relief air as the isolation plate assemblies 11 move up and down. Identical shell panels 4 fit around the perimeter of the decks to form the chambers. The deck segments fit together around seal ring 40 that houses seal 3 against isolation plate assembly rods 2. Likewise, identical segments fit together around plate ring 41 to form isolation plates 1 together with rods 2 and plate seals 5 against shell panel 4 to form isolation plate assembly 11. Lift lines 14 fit to the bottom of terminal box 13 at outlets 18 and to the top of terminal boxes at inlets 17 and standpipe segments 15 together with bypass lines 16 mount under terminal boxes at inlets 17. Pressure lines 19 together with pressure valve 20 and atmospheric relief valves 21 attach to shell panels 4. Valves 12 fit into transfer ports 8 and inlets 17.

Considered together, FIG. 15, FIG. 16, FIG. 17, FIG. 18, and FIG. 19 describe another embodiment. Because isolation plate assemblies all move in unison, all volumes C2 and A1 are always at atmospheric pressure, and volumes A1 and C2 do not need to change, it is possible to remove deck 9 between stages and allow the isolation plate assemblies to share that travel distance. The space saved is distributed between all chambers increasing lift volumes and performance of the stack. Volumes A1 and C2 are combined between isolation plate assemblies and designated A1 C2. Hollow sleeves 47 and 48 fit inside rods 2 for alignment and atmospheric pressure is available down the length of the rods and delivered to volumes A2 and A1 C2 through ports 45 and 46.

Figure 22:
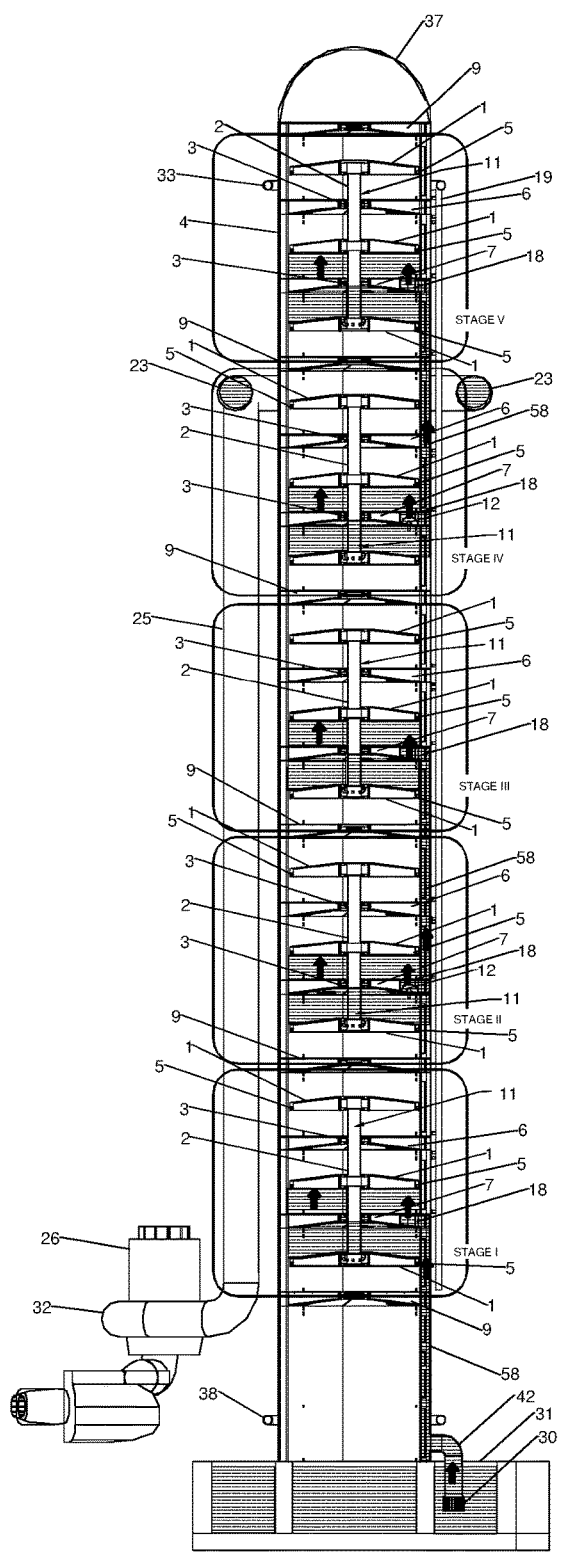
FIG. 22 is a longitudinal section of a model of a stack with internal lift and standpipe cells through a lift cell and in the 'Lift' stroke.
Figure 23:
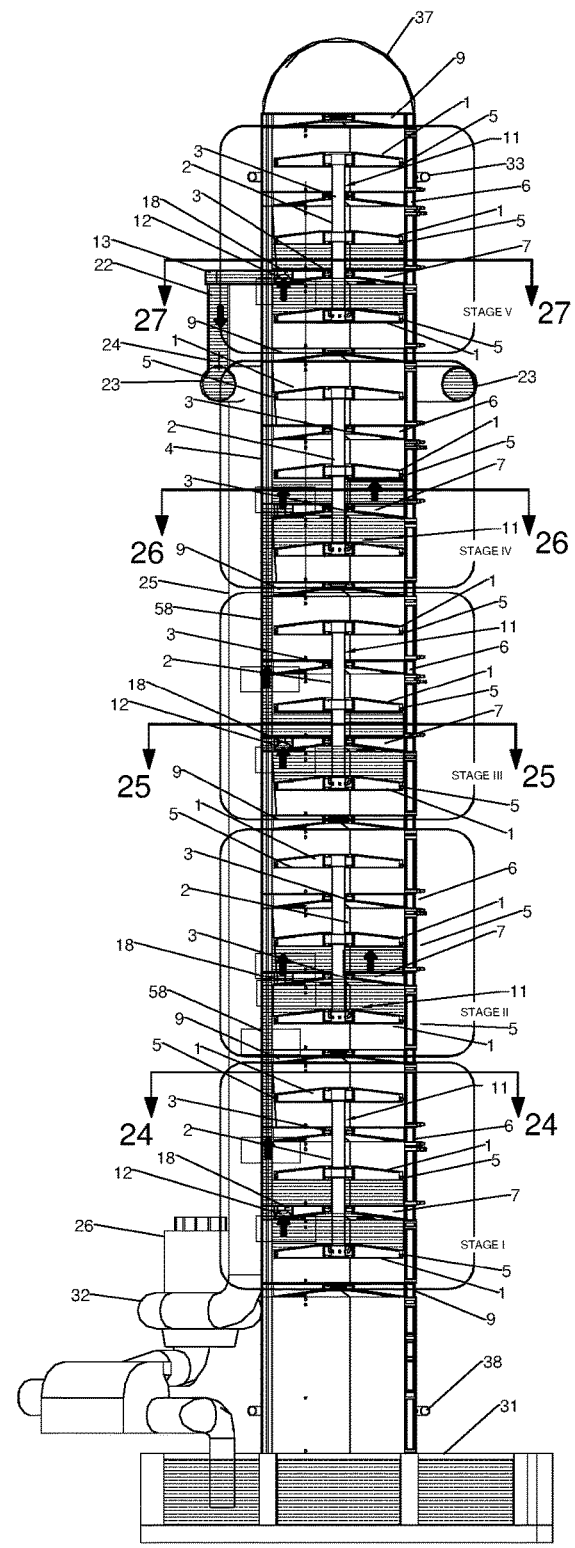
FIG. 23 is a longitudinal section of a model of a stack with internal lift and standpipe cells through a lift cell and discharge line to the collection ring and in the 'Lift' stroke and indicating sections shown in FIG. 24, FIG. 25, FIG. 26, and FIG. 27.

Considered together, FIG. 20, FIG. 21, FIG. 22, and FIG. 23 describe yet another embodiment. The exterior lift lines 14, standpipes 15, and bypass lines 16 are replaced by internal lift cells 58 and standpipe cells 59 formed in shell panels by inside and outside walls and partitions into vertical chambers. Matching vertical chambers in the decks connect the deck inlets and outlets to the lift cells and provide full height continuity to the standpipe cells. FIG. 21 is an exterior perspective view of the embodiment with the key features of previously described configurations with some variations. Discharge lines 22 connect to terminal blocks 13 in the upper stage that tap into the lift cells 58. Influent lines 42 with foot valves 30 run from reservoir 31 to lift cells 58. FIG. 20 is a section through a set of standpipe cells 59 with the stack in the 'Transfer' stroke. FIG. 22 is a section through a series of active lift cells 58 with influent line 42 and foot valve 30 at the bottom stage. FIG. 23 is a slightly rotated section relative to FIG. 22 through a different set of active lift cells leading to terminal box 13 and discharge line 22 to detention ring 23 at the top stage. Cross sections are shown on FIG. 23 as FIG. 24, FIG. 25, FIG. 26, and FIG. 27.

Figure 24:
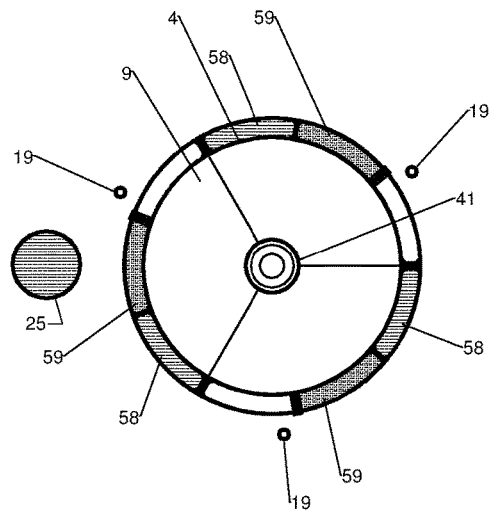
FIG. 24 is a section cut according to FIG. 23 through a stack with internal lift and integrated standpipe cells above an isolation plate location.

FIG. 24 is a section cut through volume C2 looking down on identical isolation plate segments 1 fit together with plate ring 41 to form isolation plate assembly 11. Identical shell panels 4 consisting of inner and outer walls together with transverse partitions forming lift cells 58 and standpipe cells 59 fit together forming chambers. The lift cells are active (lifting fluid) or passive (empty) depending on their position above or below the flow deck 7. Pressure lines 19 deliver low pressure (vacuum) to the stages, fluid is flowing up through lift cell 58, and down to turbines through pen stock line 25.

Figure 25:
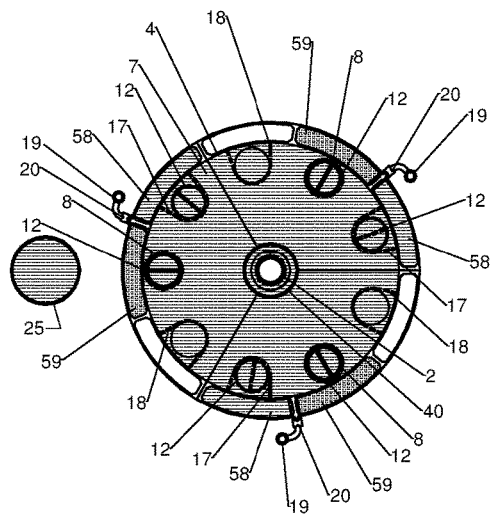
FIG. 25 is a section cut according to FIG. 23 through a stack with internal lift and integrated standpipe cells above a flow deck location.

FIG. 25 is a section cut through volume B2 looking down on flow deck 7 which is rotated relative to the flow deck of the stage below so that inlets 17 below line up with outlets 18 above. Fluid is flowing up from volume A2 below the flow deck, through inlets 17 facing volume A2, and up active lift cells 58 to the stage above. Fluid is flowing up into volume B1 from active lift cells 58 below the passive lift cells shown and through outlets 18 facing into volume B1. Valves 12 in inlets 17 prevent back flow during the 'Transfer' stroke and the valves 12 in transfer ports 8 are closed to volume A2 below.

Figure 26:
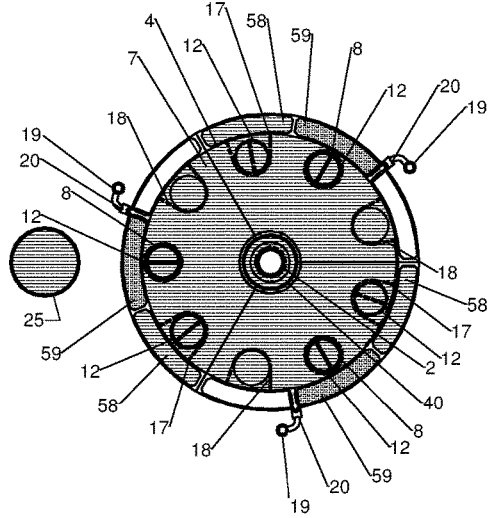
FIG. 26 is a section cut according to FIG. 23 through a stack with internal lift and integrated standpipe cells above a flow deck location showing the alternating lift cell.
Figure 27:
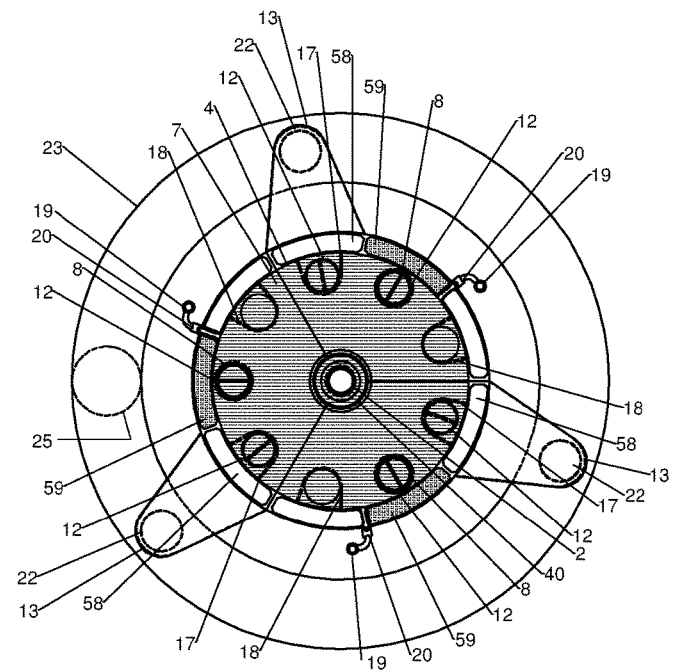
FIG. 27 is a section cut according to FIG. 23 through a stack with internal lift and integrated standpipe cells above the collection ring location.

FIG. 26 is a section cut through volume B2 looking down on flow deck 7 which is rotated relative to the flow deck of FIG. 25 below so that inlets 17 below line up with outlets 18. Fluid is flowing up from volume A2 below the flow deck, through inlets 17 facing volume A2, and up active lift cells 58 to the stage above. Fluid is flowing up into volume B1 from active lift cells 58 below the passive lift cells shown and through outlets 18 facing into volume B1. Valves 12 in inlets 17 prevent back flow during the 'Transfer' stroke and the valves 12 in transfer ports 8 are closed to volume A2 below.

FIG. 25 is a section cut through volume B2 looking down on flow deck 7 which is rotated relative to the flow deck of FIG. 26 below so that inlets 17 below line up with outlets 18. Fluid is flowing up from volume A2 below the flow deck, through inlets 17 facing volume A2, and up active lift cells 58 to the stage above. Fluid is flowing up into volume B1 from active lift cells 58 below the passive lift cells shown and through outlets 18 facing into volume B1. Valves 12 in inlets 17 prevent back flow during the 'Transfer' stroke and the valves 12 in transfer ports 8 are closed to volume A2 below. Terminal blocks 13 extend to discharge lines 22 down to detention ring 23.

Figure 28:
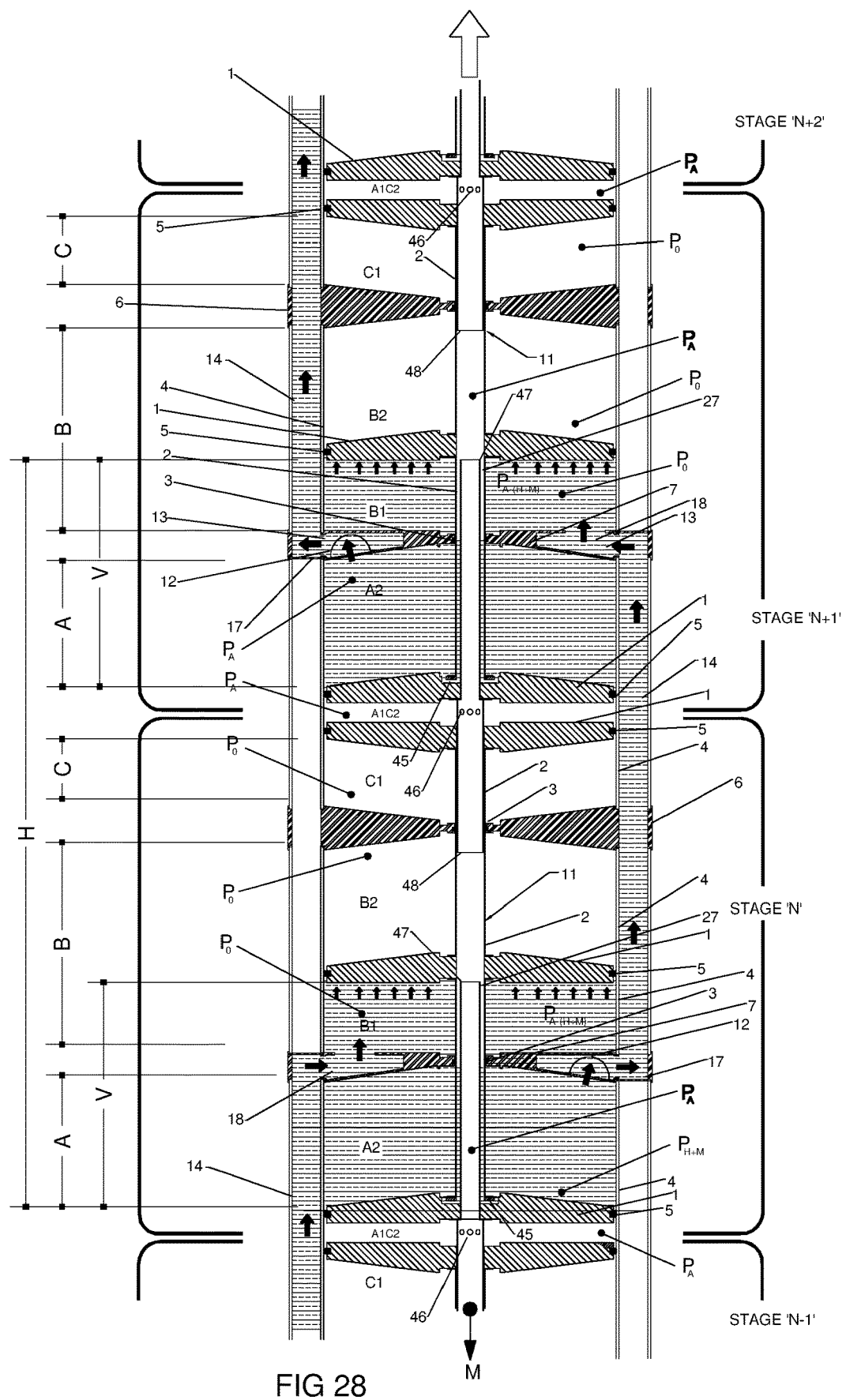
FIG. 28 is a longitudinal section of a model of a shared chamber stack with internal lift and standpipe cells in the 'Lift' stroke.
Figure 29:
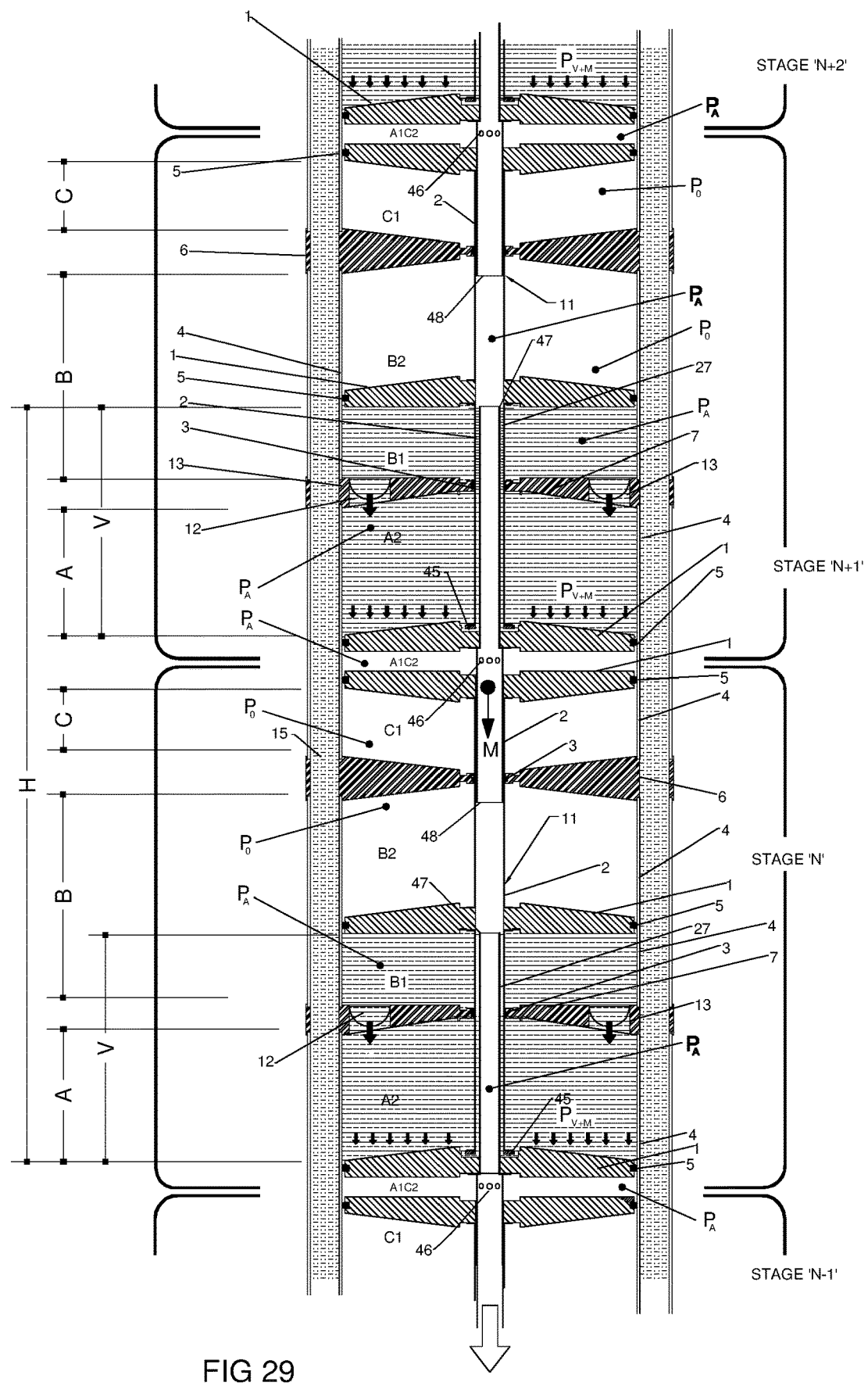
FIG. 29 is a longitudinal section of a model of a shared chamber stack with internal lift and standpipe cells in the 'Transfer' stroke.

Considered together, FIG. 28 and FIG. 29 describe another embodiment similar to the discussion of FIG. 15 through FIG. 19 and repeated here. Because isolation plate assemblies all move in unison, all volumes C2 and A1 are always at atmospheric pressure, and volumes C2 do not need to change, it is possible to remove deck 9 between stages and allow the isolation plate assemblies to share that travel distance. The space saved is distributed between all chambers increasing lift volumes and performance of the stack. Volumes A1 and C2 are combined between isolation plate assemblies and designated A1 C2. Hollow sleeves 47 and 48 fit inside rods 2 for alignment and atmospheric pressure is available down the length of the rods, conduit 27, and delivered to volumes A2 and A1 C2 through ports 45 and 46.

Figure 30:
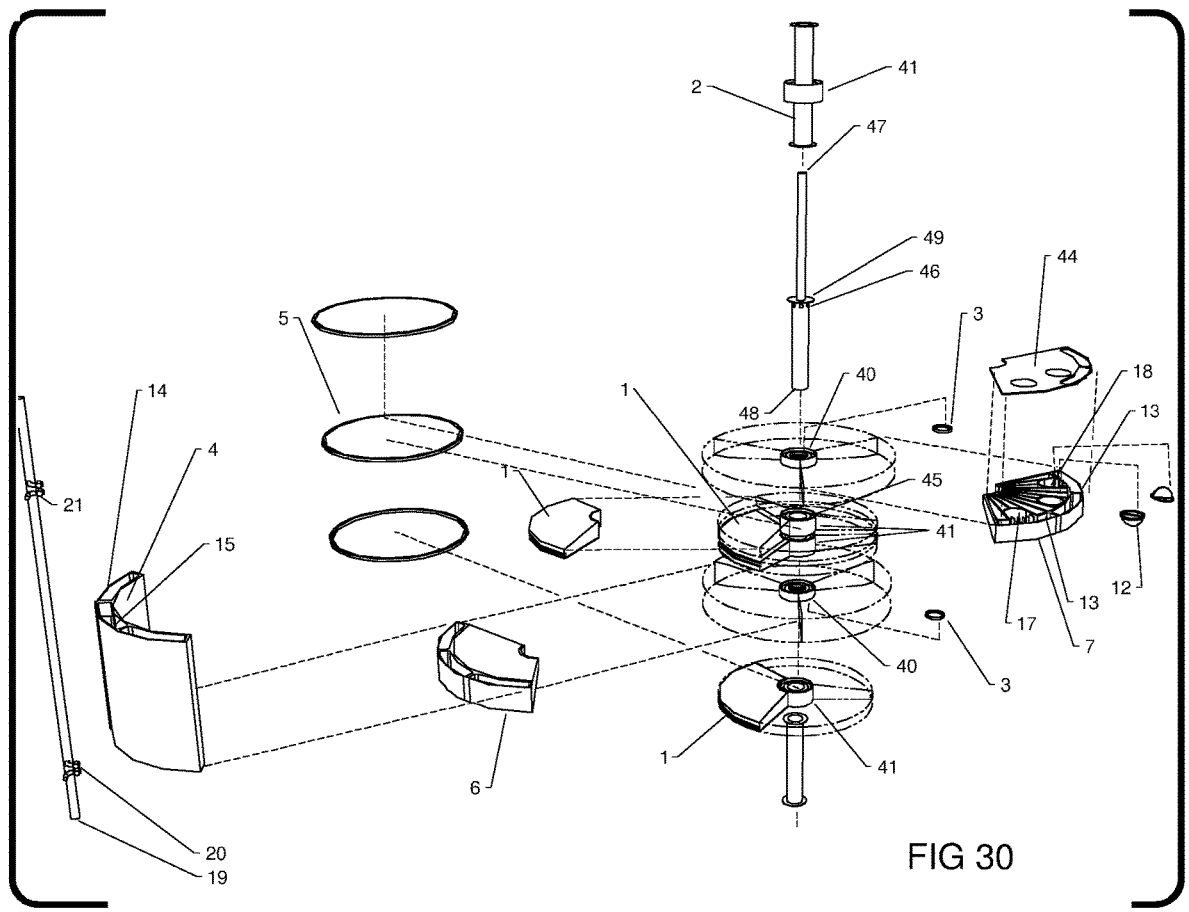
FIG. 30 is an exploded perspective view of typical stage components for a stage with internal lift and standpipe lines and shared chamber stack.

FIG. 30 is an exploded perspective view of a stage of the currently considered embodiment. Identical segments are joined to form complete seal decks 6 and flow decks 7 to control flows in and out of the stage. Identical shell panels with exterior and interior walls 4 fit around the perimeter of the decks to form the chambers and fluid cells 14 and 15. The deck segments fit together around seal ring 40 that houses seal 3 against isolation plate assembly rods 2. Likewise, identical segments fit together around plate ring 41 to form isolation plates 1 together with rods 2 and plate seals 5 against shell panel 4 to form isolation plate assembly 11. Lift cells 14 and standpipe cells 15 within shell panels fit to the bottom of terminal boxes 13 at outlets 18 and to the top of terminal boxes at inlets 17. Pressure lines 19 together with pressure valve 20 and atmospheric relief valves 21 attach to shell panels 4. Valves 12 fit into transfer ports 8 and outlets 18.

Figure 31:
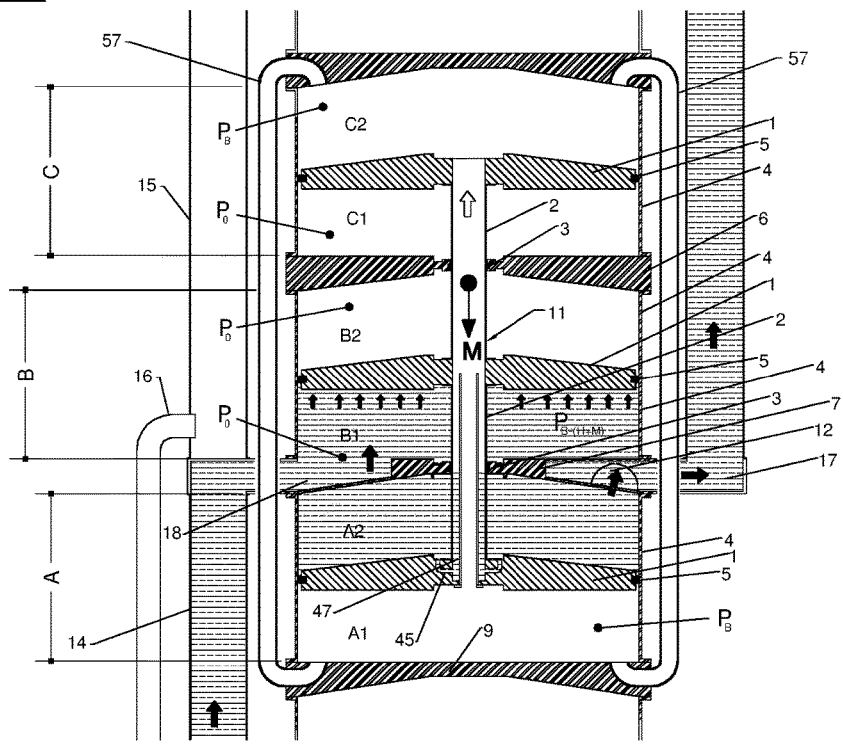
FIG. 31 is a longitudinal section of a typical stage with relief lines connecting the top and bottom volumes.

FIG. 31 is a variation of the embodiment depicted in FIG. 6 and FIG. 7, but applicable to all embodiments, and particularly where atmospheric pressure $P_A$ is substituted by a greater boosted pressure $P_B$ in volumes A1 and C2. Relief lines 57 connect volumes A1 and C2 so that when Isolation plate assembly 11 moves up and down during fluid transfers, air may move between volumes A1 and C2 maintaining a constant volume A1+C2.

Figure 32:
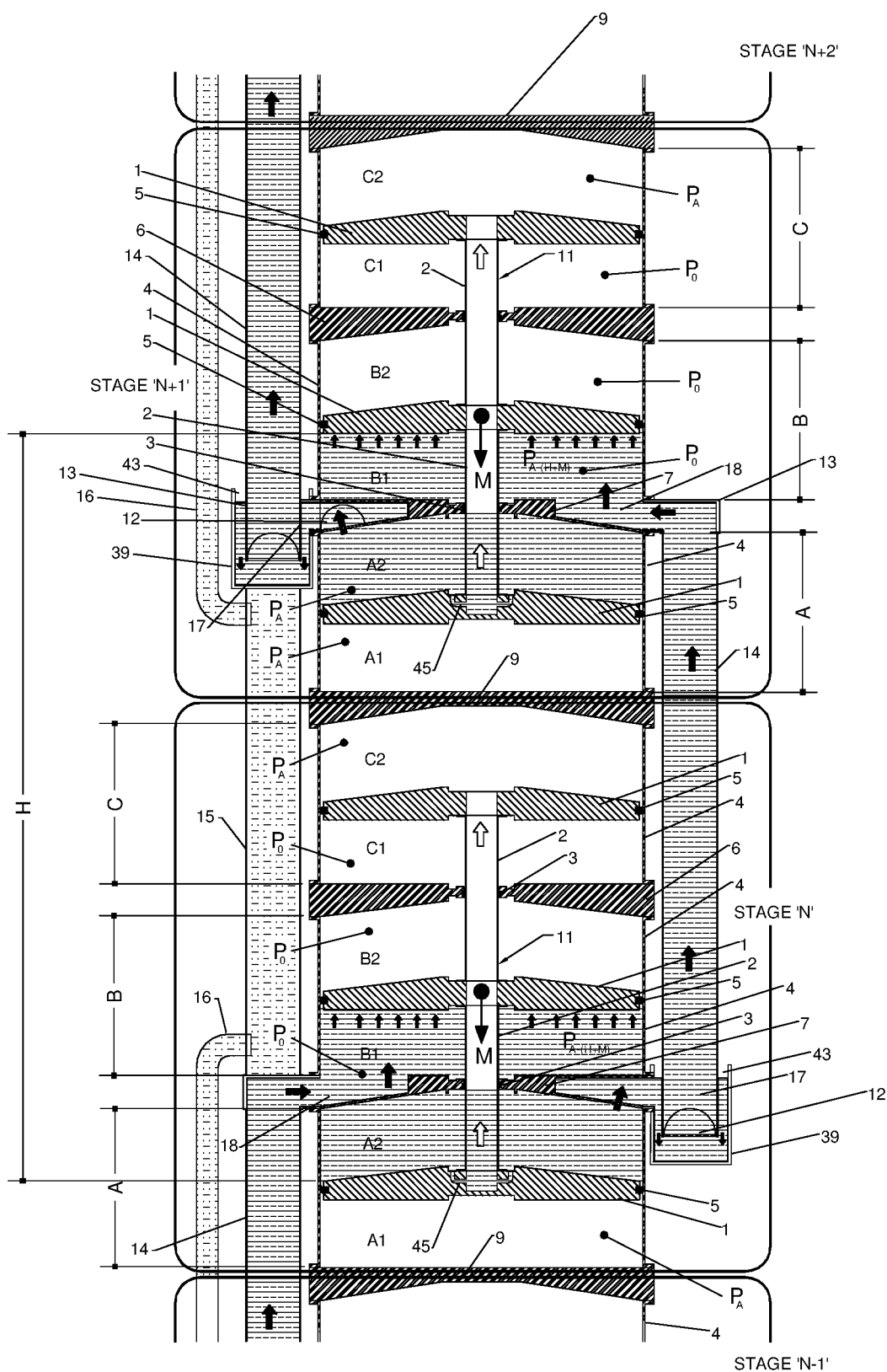
FIG. 32 is a longitudinal section of typical stages with external lift, integrated standpipe lines, and an air gap between the transfer chambers and lift lines.

FIG. 32 is a variation of the embodiment depicted in FIG. 4 and FIG. 5, but applicable to all embodiments driven by atmospheric pressure $P_A$, where lift lines 17 are separated from the effluent from volumes A2 by an air gap 43 in transfer chamber 39. This eliminates unit fluid pressure $P_H$ from acting directly on the face of isolation plate 1 between volumes A1 and A2. Valve 12 prevents back flow in lift line 17 into transfer chamber 39 during the 'Transfer Phase'.

Figure 33A:
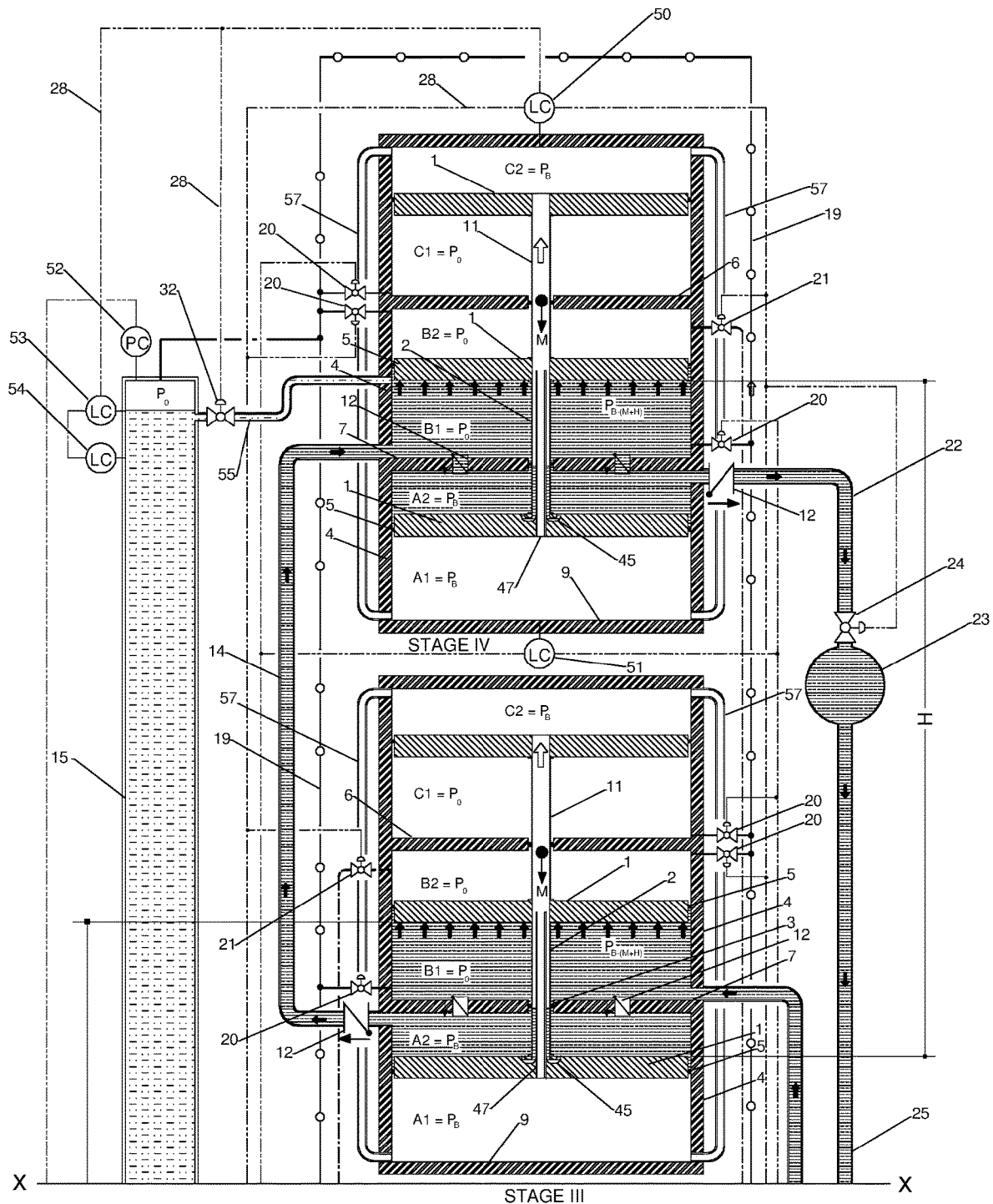
FIG. 33A is a schematic view of the top half of a column of stages with a match line to a schematic view of the bottom half of a column of stages represented in FIG. 33B, both in the 'Lift' stroke.
Figure 33B:
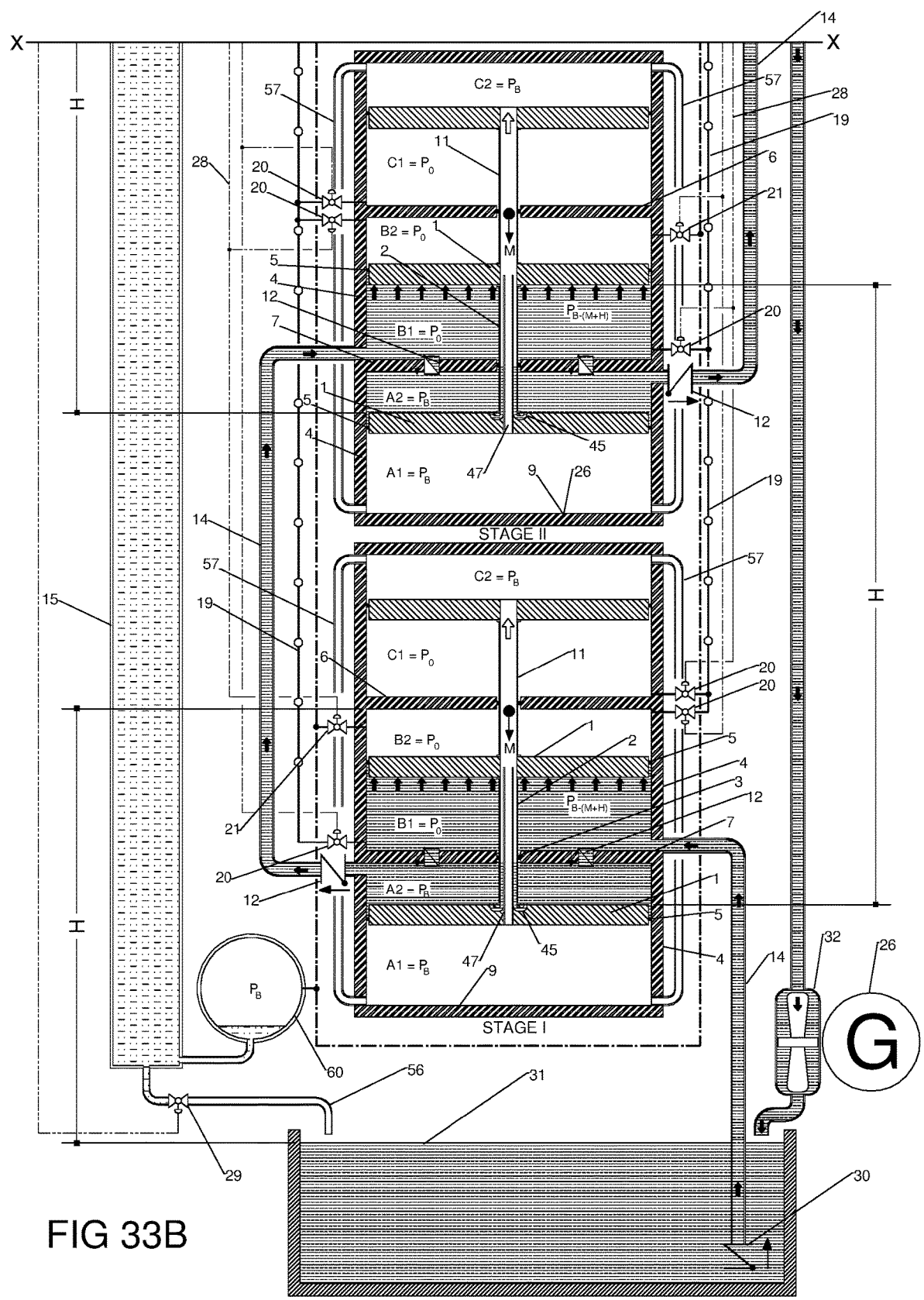
FIG. 33B is a schematic view of the bottom half of a column of stages with a match line to a schematic view of the top half of a column of stages represented in FIG. 33A, both in the 'Lift' stroke.

The function of a stack or vertical array of stages using a driving boosted pressure can best be understood by referring to schematic FIG. 33A and FIG. 33B considered together along match line X-X. The stack in the figures is in the 'Lift' stroke, so all isolation plate assemblies 11 in all stages are traveling up as fluid moves into volumes B1 as described in the FIG. 1 commentary. Other elements of the embodiment are shown. The stages are connected by fluid lift lines 14 with a valve 12 at the base of each and Stage I is supplied by a lift line 14 fitted with a foot valve 30 into reservoir 31. A standpipe 15 of a height sufficient to deliver low or zero pressure from the top provides the pressure to valves 20 and valve actuators through pressure lines 19. Additionally, boosted pressure is tapped from pressure vessel 60 at the bottom of standpipe 15 and fed through valves 21 actuated by pressure lines 19. In order to maintain boosted pressure without loss in volumes A1 and C2 and because A1+C2 remains constant throughout the motion range of isolation plate assembly 11, the volumes are connected by relief lines 57 and/or hollow connecting rods 2 and pressure sleeves 47. As isolation plate assembly 11 moves, displaced air at boosted pressure travels between volumes A1 and C2 through the relief lines 57 and/or connecting rods 2 and pressure sleeve 47. In Stage I, fed by reservoir 31, height H above the reservoir is set so that residual pressure $P_R$ is based on atmospheric pressure $P_A$. The height H between stages above Stage I can be increased since residual pressure $P_R$ is based on boosted pressure $P_B$. Referring to the uppermost Stage IV, the discharge from volume A2, instead of rising to a higher stage, is run through valve 12, discharge line 22, shut off valve 24, and into detention vessel 23. Vessel 23 is located below solid deck 9 under volume A1 of Stage IV so that siphon action reduces unit pressure to chamber A isolation plate and improves flow during the lift. Detention vessel 23 stores enough fluid to last through both 'Lift' and 'Transfer' strokes when metered out through penstock line 25 to turbine 32 driving generator 26 and back into reservoir 31. Topping line 55 leads to standpipe 15 through topping valve 32 from volume B1 and bleed off line 56 leads from the bottom of the standpipe through bleed valve 29 to reservoir 31. When isolation plate assemblies 11 reach the top of chamber and all volumes A2, B2, and C2 are at minimum (zero), level control 50 senses the position and checks standpipe fluid level through level control sensor 54. If low, before volume B1 is switched to pressure $P_B$, topping valve 32 is opened and the standpipe is filled through topping line 55 until level control sensor 53 closes topping valve 32 while simultaneously, shutoff valve 24 is closed and valve 12 in discharge line 22 traps the fluid in the line while valve 20 in low pressure line 19 to volume B2 cycles to refresh the low (zero) pressure. Pressure control sensor 52 continuously monitors the top of stand pipe pressure and modulates bleed valve 29 to let off fluid back into reservoir 31 and maintain operating pressure. The sequence ends by relief valves 21 letting boosted pressure into volumes B1 of all stages leading to the 'Transfer' stroke.

Figure 34A:
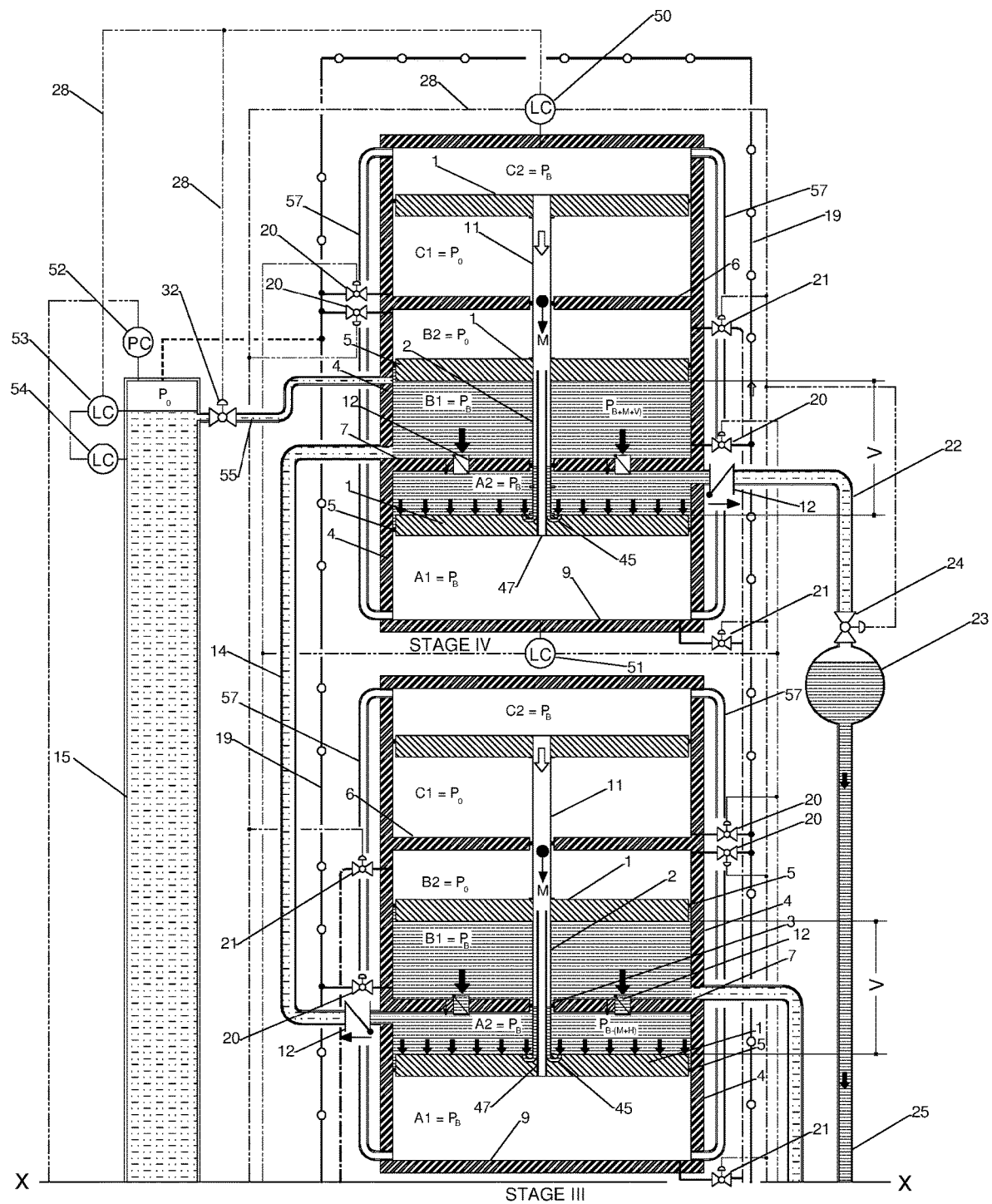
FIG. 34A is a schematic view of the top half of a column of stages with a match line to a schematic view of a bottom half of a column of stages represented in FIG. 34B, both in the 'Transfer' stroke.
Figure 34B:
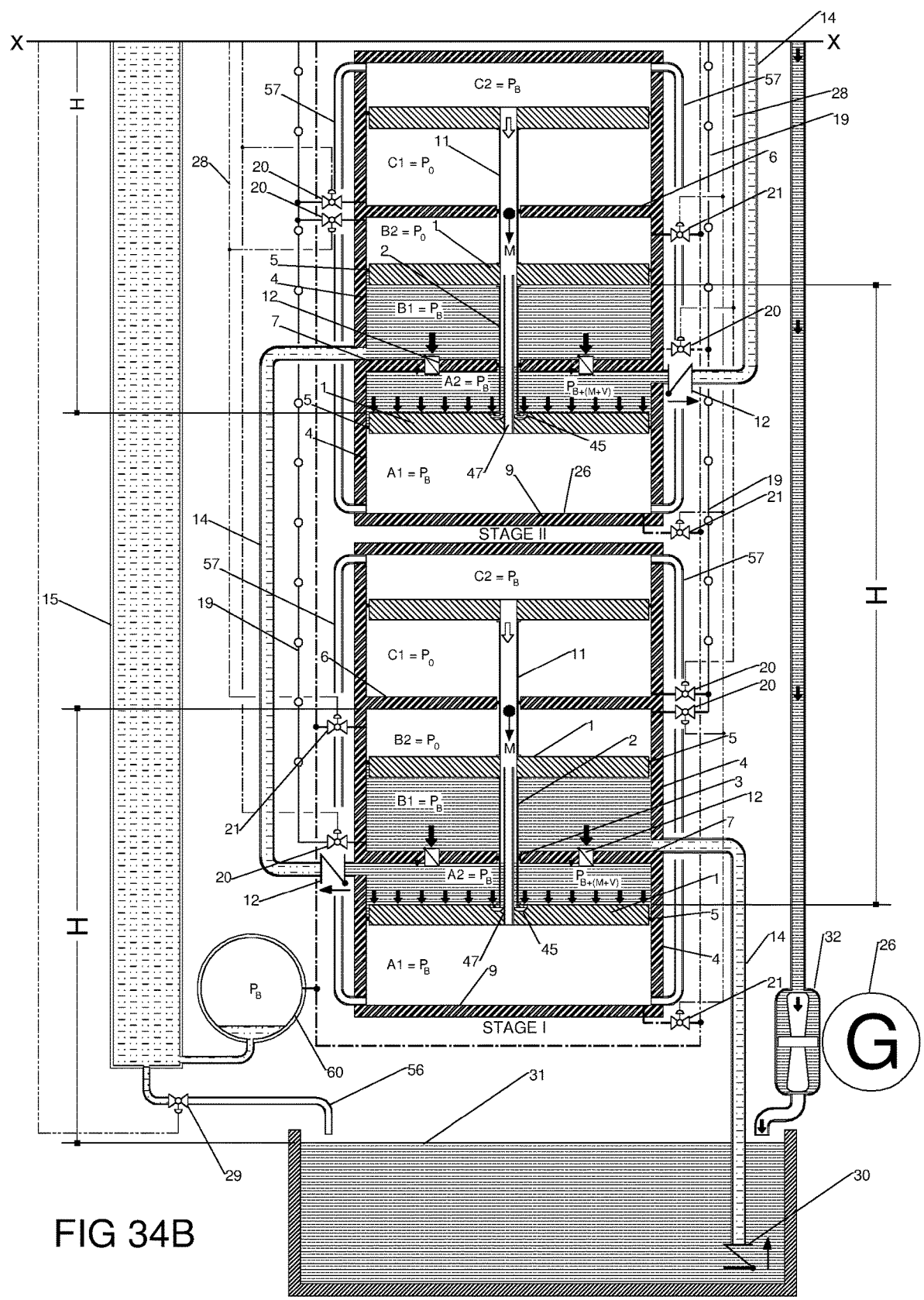
FIG. 34B is a schematic view of the bottom half of a column of stages with a match line to a schematic view of a top half of a column of stages represented in FIG. 34A, both in the 'Transfer' stroke.

The 'Transfer' stroke can be understood by referring to schematic stack diagrams of FIG. 34A and FIG. 34B together along match line X-X. The fluid in lift lines 14 is static and held in place by valves 12. The fluid in discharge line 22 is held between valve 12 and shutoff valve 24. Fluid pressure now opens valves 12 in flow decks 7 so that all fluid transfers from Volumes B1 to volumes A2 of the same stages, driving the isolation plate assemblies down at a velocity regulated by modulating air through relief lines 57. Fluid continues to be metered from detention vessel 23 through pen-stock line 25 to turbine 32 and back to reservoir 31 during the 'Transfer' stroke. When the isolation plate assembly 11 reaches the bottom position and all volumes A1, B1, and C1 are zero, level control sensor 51 cycles valve 20 from low (zero) pressure line 19 to volume C1 to refresh the pressure, then simultaneously opens valve 20 from low (zero) pressure line 19 to volume A1 and shut off valve 24 to detention vessel 23 to begin the 'Lift' stroke.

Figure 35A:
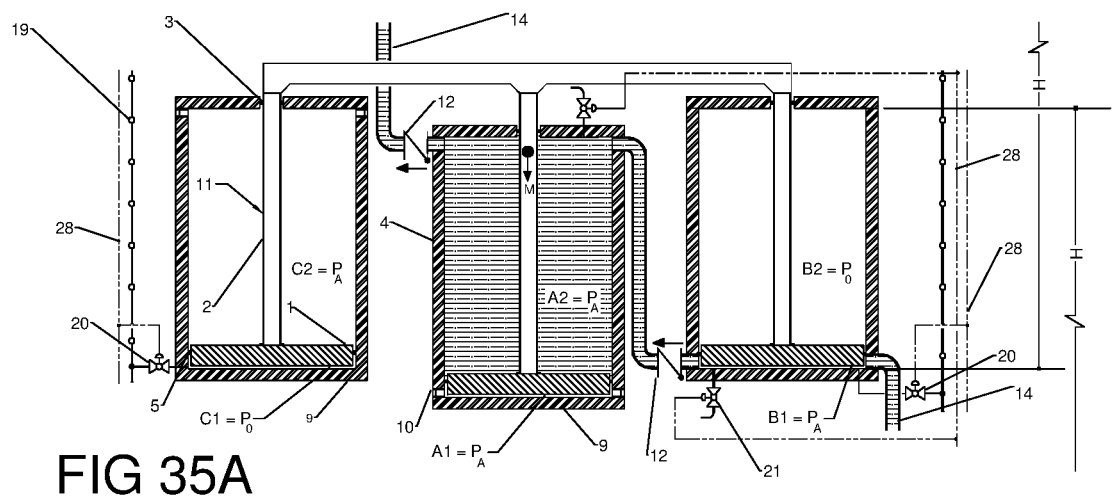
FIG. 35A is a schematic view of a single stage with horizontally arranged chambers showing the static state at the end of the Transfer stroke and before the start of the 'Lift' stroke.
Figure 35B:
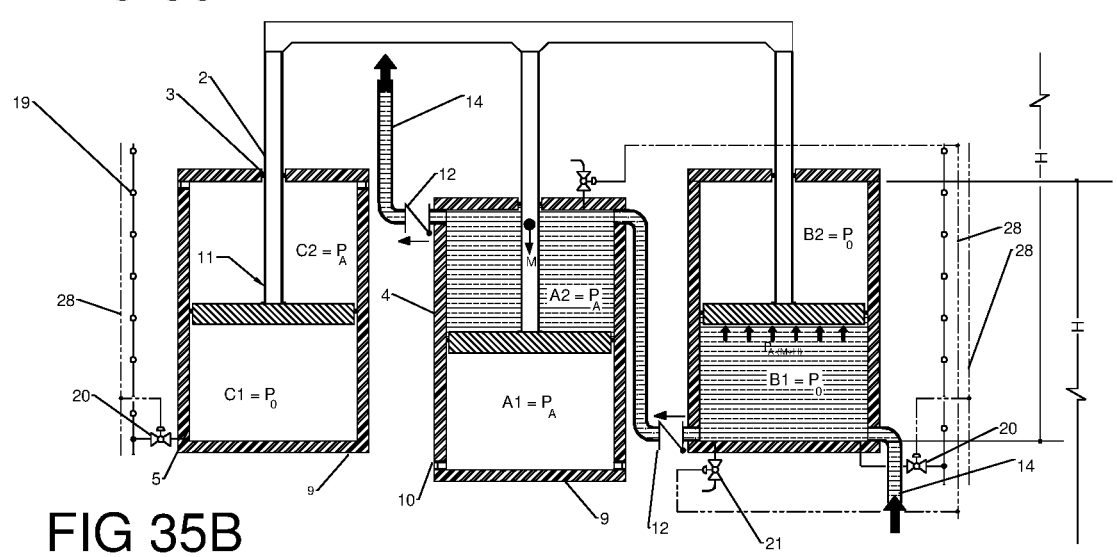
FIG. 35B is a schematic view of a single stage with horizontally arranged chambers showing the initiation and process of the 'Lift' stroke.
Figure 35C:
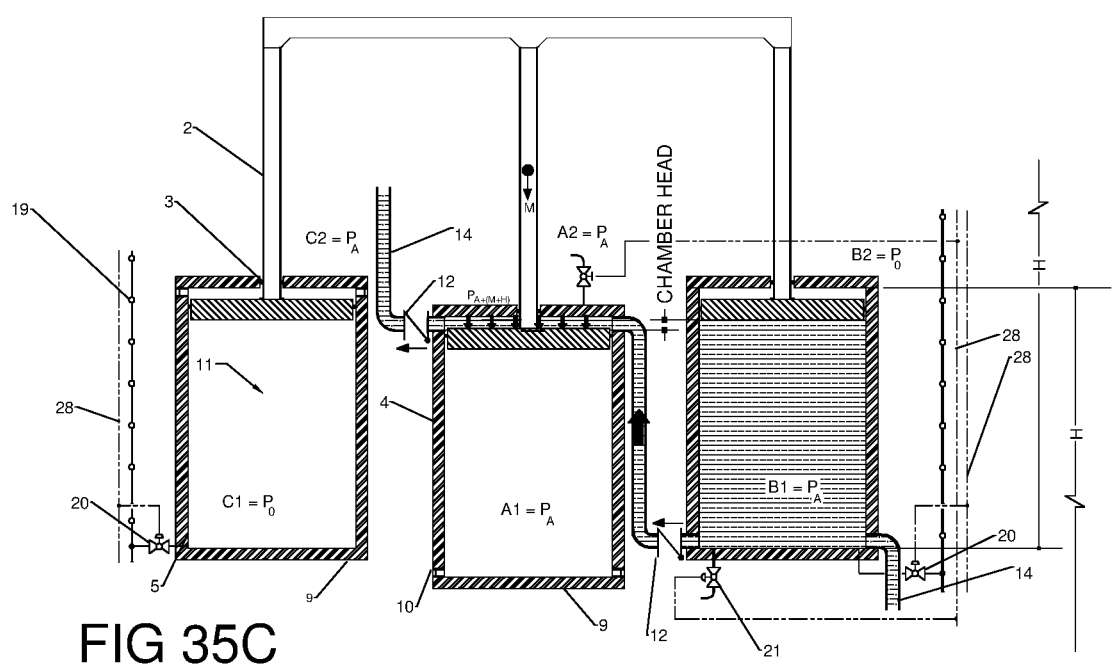
FIG. 35C is a schematic view of a single stage with horizontally arranged chambers showing the initiation and process of the 'Transfer' stroke.

The alternate embodiment of the fluid lift assembly may best be understood by referring to the schematic diagrams in FIG. 35A, FIG. 35B, and FIG. 35C that depict a single stage comprised of three horizontally arranged chambers consisting of walls, seal decks, flow deck, relief pressure decks, an isolation plate assembly, pressure lines, valves and seals. Chamber A may be set at a lower elevation than Chambers B and C to create fluid head that assists fluid flow from chamber B1 to chamber A2. The cycle begins with the FIG. 35A configuration. Isolation plate assembly 11; comprised of isolation plates 1 with seals 5 against chamber walls 4, and connecting rods 2 against seals 3 in decks 6 is at rest in the bottom most position with all fluid contained in volume A2 except for incidental fluids in lines stopped by valves 12. Volumes A1, B1, and C1 are minimum or essentially zero. At this point, low pressure or vacuum valve 20 to volume C1, attached to low pressure or vacuum line 19 from the top of standpipe or other low pressure (vacuum) source cycles to maintain low (zero) pressure in volume C1 should there be any seal leakage. Valves 21, connected to the atmospheric pressure source and 20, connected to the system standpipe or other low (zero) pressure source are actuated by control lines 28. Volumes A1, A2, B1, and C2 are at atmospheric pressure while volumes B2 and C1 are at $P_0$ or 'zero' pressure so that the system is static and in balance. Pressure relief ports 10 in pressure relief decks maintain atmospheric pressure in volumes A1 and C2.

The events depicted in FIG. 35B are set in motion by switching the pressure in volume B1 of all stages from atmospheric $P_A$ to low or zero pressure $P_0$ by means of valve 20 through low (zero) pressure line 19 while the isolation plate assembly 11 is at the bottom position and volume B1 is essentially zero. Lift lines 14 connect volume A2 of this stage to volume B1 of the stage above and connect volume B1 of this stage to volume A2 of the stage below. Transfer lines 61 connect the bottom of volume B1 to the top of volume A2. Valves 12 in lift line 61 are closed to prevent flow between volume A2 and B1 of the same stage. Atmospheric pressure in volume A1 now drives the fluid in volume A2 of this stage through fluid transfer tube 14 to volume B1 of the stage above. Residual pressure $P_{A-(M+H)}$ applied to the bottom face of the chamber B isolation plate 1 drives the isolation plate assembly 11 of all stages up simultaneously as fluid moves from volumes A2 to B1 of contiguous stages. FIG. 35B is defined as the 'Lift' stroke.

The 'Transfer' stroke depicted in FIG. 35C is initiated by opening relief valve 21 and letting atmospheric pressure into volumes B1. Volumes B1, A2, and A1 are now all at atmospheric pressure. Valves 12 in Transfer lines 61 open to allow the fluid to transfer from volume B1 to volume A2 of the same stage. Pressure $P_{A+M+CH}$ applied to the top face of the chamber A isolation plate 1 drives the isolation plate assembly 11 down to the FIG. 35A position. As fluid moves from volume B1 to A2 fluid mass acting on chamber A isolation plate increases, causing isolation plate assembly 11 to accelerate downward. Valves in relief port 10 opening into volumes A1 modulate to control air discharge and regulate the rate of the isolation plate assembly 11 descent. When the isolation plate assembly 11 reaches the bottom position, volumes A1, B1, and C1 are now at minimum or essentially zero. Valve 20 to volume C1 and from low pressure or vacuum line 19 cycles to maintain low (zero) pressure in C1 should there be any seal leakage.

It is seen that the present invention addresses and corrects the many disadvantages of the currently used methods of producing electrical power and more generally raising water without consuming power. It provides a means of producing power that requires no fuel, can be built anywhere, can be scaled to meet any power requirement, emits no pollution, and is not dependent on location. Further it provides a means of producing power that operates with low stresses and temperatures allowing it to be manufactured with low cost readily available synthetic materials and with a design that uses standard components that can be mass produced, easily shipped, and rapidly assembled on site. The power plants are self regulating and self sustaining so that they may be owned by individuals, corporations, and local governments allowing them to be placed at the point of use, eliminating the need for long distance transmission lines and high power losses. Because the power plants can be sprinkled across the power grid with no environmental impact, the multiple nodes make the power grid invulnerable to attack and allow adjoining nodes to provide power to those locations that are temporarily down due to maintenance or failures. Further, local operators may provide power to constituents at no cost or sell power back into the grid for distribution.

Although the description above contains many specifics, these should not be construed as limiting the scope of the invention but merely as providing illustrations of some of the presently preferred embodiments of this invention. For example, where three components are shown to form a deck or plate, more or less may be used. One or more lines may connect any number of stages and any number of stage stacks may be manifolded together to produce any power output. Stages do not have to be stacked directly above one another, but may be offset, as in a single family home where a stage on one floor in a closet may be removed from a stage on another floor in a closet and connected by lines. The shape of the chambers may vary and more than one connecting rod may connect the plates.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

Thus the scope of the invention should be determined by the appended claims and their legal equivalents, rather than by the examples given.

PARTS NUMBERS

1 . . . Isolation Plate
2 . . . Connecting Rod
3 . . . Deck Seal
4 . . . Chamber Wall
5 . . . Isolation Plate Seal
6 . . . Chamber Deck
7 . . . Flow Deck
8 . . . Transfer Port
9 . . . Solid Deck
10 . . . Air Relief Ports or Valves
11 . . . Isolation Plate Assembly
12 . . . Valve
13 . . . Terminal Boxes
14 . . . Lift Lines
15 . . . Standpipe
16 . . . Bypass Line
17 . . . Outlet Chamber
18 . . . Inlet Chamber
19 . . . Pressure Lines
20 . . . Pressure Valve
21 . . . Atmosphere Relief or Boosted Pressure Valve
22 . . . Discharge Line
23 . . . Detention Vessel
24 . . . Shutoff Valves
25 . . . Penstock Line
26 . . . Generator
27 . . . Conduit, Rod
28 . . . Valve Actuator Line
29 . . . Bleed Off Valve
30 . . . Foot Valve
31 . . . Reservoir
32 . . . High Velocity Turbine
33 . . . Pressure Distribution Ring
34 . . . Low Velocity Turbine
35 . . . Return Line
36 . . . Air Relief Screen
37 . . . Weather Cap
38 . . . Standpipe Leveling Ring 39 ... Transfer Chamber
40 ... Seal Ring
41 ... Plate Ring
42 ... Influent Line
43 ... Air Gap
44 ... Cover Plate
45 ... Chamber Port
46 ... Common Port
47 ... Pressure Sleeve
48 ... Alignment Sleeve
49 ... Closure Plate
50 ... Top Position Control Sensor
51 ... Bottom Position Control Sensor
52 ... Pressure Control Sensor
53 ... Fluid Level Control Sensor-High
54 ... Fluid Level Control Sensor-Low
55 ... Topping Line
56 ... Bleed Off Line
57 ... Relief Line
58 ... Lift Cell
59 ... Standpipe Cell
60 ... Pressure Chamber
61 ... Transfer Line

What is claimed is:

1. A system for raising fluid comprising:
a number of stage assemblies arranged vertically where:
  each said stage assembly consists of three chambers of equal cross sectional area and:
    said chambers are formed by straight vertical walls circumscribing the perimeter of said chambers and terminating into upper and lower solid decks, and:
    said chambers are positioned vertically joined to each other so each said stage assembly has a top chamber, middle chamber, and bottom chamber, where:
  a solid movable plate located in each said chamber an equal distance above each said chamber's said lower deck divides each said chamber into an upper and lower cell, and:
    said movable plates have a pressure seal between said chamber walls and said plates, and:
    said movable plates are joined together by connecting rods passing through apertures in said solid decks forming a plate collective where:
    a pressure seal is provided between said solid deck apertures and said connecting rods, and:
    said middle chamber lower cell and bottom chamber upper cell are connected by passages with valves and:
    fluid conduits with valves enter said middle chamber lower cells and bottom chamber upper cells, and:
    pressures in said upper and lower cells in said top, middle, and bottom chambers are regulated by external pressure sources, and:
  in a vertical array of stage assemblies where:
    the bottom most stage assembly middle chamber lower cell fluid conduits connect to a fluid reservoir below and the fluid conduits from bottom chamber upper cell connect to the middle chamber lower cell of the stage assembly immediately above said bottom most stage assembly, and:
    the top most stage assembly bottom chamber upper cell fluid conduits connect to a detention vessel and the middle chamber lower cell connects to the bottom chamber upper cell fluid conduits of the stage assembly immediately below said top most stage assembly, and:
    all intermediate stage assembly middle chamber lower cell fluid conduits connect to the bottom chamber upper cells of the stage assembly directly below said intermediate stage assembly, and:
  stage assemblies are spaced vertically at intervals less than the height of a said system fluid column with a base pressure equal to atmospheric pressure, and
  stage assemblies operate through a lift cycle and a transfer cycle, where:
    the lift cycle begins with said plate collectives at the bottom position with all said plates tight to the chamber bottom decks so that all upper cell volumes in all chambers are maximum and all lower cell volumes in all chambers are minimum, and:
    all upper cells in bottom chambers and fluid conduits are filled with fluid, and:
    said valves between middle chamber lower cells and bottom chamber upper cells are closed, and:
    all top chamber upper cells, middle chamber lower cells, and bottom chamber upper and lower cells are open to atmospheric pressure, and:
    all top chamber lower cell and middle chamber upper cell pressures are maintained at vacuum or zero pressure, and:
    all middle chamber lower cells are then switched to vacuum or zero pressure, and:
  the transfer cycle begins when said plate collectives are tight to the chamber upper decks, so that all upper cell volumes in all chambers are minimum and all lower cell volumes in all chambers are maximum, and:
    all lower cells in middle chambers are filled with fluid, and:
    all middle chamber lower cells are switched to atmospheric pressure, and:
    said valves in passages between bottom chamber upper cells and middle chamber bottom cells are opened, and:
  fluid is released from said detention vessel.

2. The system as recited in claim 1, wherein the effluent from said detention vessel is directed through electrical power generating turbines then returned to said reservoir or released.

3. The system as recited in claim 1, wherein said vacuum or zero pressure is drawn from the top of a standpipe full of said fluid of a height equal to or greater than the height of said fluid having a base pressure equal to or greater than atmospheric pressure and where said fluid is replenished at intervals from fluid in the system.

4. The system as recited in claim 1, wherein said vacuum or zero pressure is provided by mechanical devices driven by an external power source or by fluid taken from the system and routed through a hydraulic motor or by power generated by the system.

5. The system as recited in claim 1, wherein said fluid conduits are routed outside the chamber walls and are part of the system structure.

6. The system as recited in claim 1, wherein said fluid conduits are formed by cavities within the chamber walls and decks.

7. The system as recited in claim 1, wherein fluid conduit inlets and outlets and pressure regulating apertures are formed within said chamber decks.

8. The system as recited in claim 1, wherein said chamber decks and said movable plates are of a size, shape, and surface finish so when in contact the volume between them is near zero.

9. The system as recited in claim 1, wherein either or both contact surfaces of said decks and said movable plates are inscribed with indentations.

10. The system as recited in claim 1, wherein openings through said movable plates aligning with hollow said connecting rods provide a passage connecting top chamber upper cell and bottom chamber lower cell volumes.

11. The system as recited in claim 1, wherein openings through top and middle chamber movable plates aligning with hollow connecting rods provide a passage open to top chamber upper cell but closed to bottom chamber lower cell and said passage having ports opening into the bottom chamber upper cell.

12. The system as recited in claim 1, wherein the solid decks between stages are eliminated so that the bottom chamber of a top or intermediate stage is combined with the top chamber of the stage directly below said top or intermediate stage creating one combined chamber sized so that the plate collectives of both said stages share the travel distance within said combined chamber.

13. The system as recited in claim 1, wherein the top chamber upper cell and bottom chamber lower cell volumes of a stage are connected by a conduit or conduits and atmospheric pressure is replaced by a higher boosted pressure drawn from the bottom of a standpipe filled with system fluid or provided by mechanical compressors and:
   vertical distance between stage assemblies is less than the height of a column of system fluid with a base pressure equaling said boosted pressure.

14. The system as recited in claim 13, wherein top stage discharge lines, detention vessel, turbines, and reservoir are at said boosted pressure and top stage discharge lines into said detention vessel have valves.

15. The system as recited in claim 1, wherein operable valves are driven by external power sources, power from the system generator, standpipe static pressure, system vacuum pressure, or system boosted pressure.

16. The system as recited in claim 1, wherein positions of said plate collectives are monitored by analog or electronic sensors and fluid flow is modulated by controllers.

17. The system as recited in claim 1, wherein said chambers with said movable plates are arranged side by side.

18. The system as recited in claim 1, wherein discharge from said detention vessel is regulated to provide a flow rate required by the end use.

19. The system as recited in claim 1, wherein key elements are assembled from a minimal number of components mass produced from plastics, polymers, composites, poly carbonates, and metals of a size transportable by truck, ship, rail, or aircraft.

* * * * *